United States Patent [19]
Jones

[11] Patent Number: 5,347,815
[45] Date of Patent: Sep. 20, 1994

[54] REGENERATIVE ADSORBENT HEAT PUMP

[75] Inventor: Jack A. Jones, Los Angeles, Calif.

[73] Assignee: California Institute of Technology, Pasadena, Calif.

[21] Appl. No.: 855,624

[22] Filed: Apr. 30, 1992

[51] Int. Cl.$^5$ .............................................. F17C 11/00
[52] U.S. Cl. ...................................... 62/46.2; 62/467; 62/480; 165/104.12
[58] Field of Search ...................... 62/46.2, 46.7, 476, 62/480, 324.2, 101; 165/104.12

[56] References Cited

U.S. PATENT DOCUMENTS

| | | | |
|---|---|---|---|
| 4,188,795 | 2/1980 | Terry | 62/102 |
| 4,402,187 | 9/1983 | Golben et al. | 62/48 |
| 4,523,635 | 6/1985 | Nishizaki et al. | 165/104.12 |
| 4,548,046 | 10/1985 | Brandon et al. | 62/79 |
| 4,610,148 | 9/1986 | Shelton | 62/480 |
| 4,623,018 | 11/1986 | Takeshita et al. | 165/104.12 |
| 4,637,218 | 1/1987 | Tchernev | 61/106 |
| 4,694,659 | 9/1987 | Shelton | 62/106 |
| 4,723,595 | 2/1988 | Yasunaga et al. | 165/104.12 |
| 4,765,395 | 8/1988 | Paeye et al. | 165/104.12 |
| 4,875,346 | 10/1989 | Jones et al. | 62/467 |
| 4,928,496 | 5/1990 | Wallace et al. | 62/46.2 |

FOREIGN PATENT DOCUMENTS 292938 12/1928 United Kingdom .

OTHER PUBLICATIONS

Design & Component Test Performance Of An Efficient 4W, 130K Sorption Refrigerator, Advances In Cryogenic Eng., vol. 35, p. 1367 (1990).

High Efficiency Sorption Refrigerator Design, Advances In Cryogenic Eng., vol. 35, p. 1375 (1990).

The Development of Silica Gel Refrigeration, Refrigerating Engineering, The Amer. Soc. of Refrig. Engs., vol. 17, No. 4, 1929.

Primary Examiner—Henry A. Bennett
Assistant Examiner—William C. Doerrler
Attorney, Agent, or Firm—F. Eugene Logan

[57] ABSTRACT

A regenerative adsorbent heat pump process and system is provided which can regenerate a high percentage of the sensible heat of the system and at least a portion of the heat of adsorption. A series of at least four compressors containing an adsorbent is provided. A large amount of heat is transferred from compressor to compressor so that heat is regenerated. The process and system are useful for air conditioning rooms, providing room heat in the winter or for hot water heating throughout the year, and, in general, for pumping heat from a low temperature to a higher temperature.

59 Claims, 9 Drawing Sheets

REGENERATIVE ADSORBENT HEAT PUMP

ORIGIN OF INVENTION

The invention described herein was made in the performance of work under a NASA Contract, and is subject to the provisions of Public Law 96-517 (35 USC 202) in which the contractor, has elected to retain title in the United States.

RELATED U.S. APPLICATION DATA

U.S. National Phase of International Ser. No. PCT/US91/07173 having International Filing Date Sep. 30, 1991, which is a Continuation-in-Part of U.S. Ser. No. 598,525, Oct. 16,1990, U.S. Pat. No. 5,046,319.

BACKGROUND OF THE INVENTION

1. Technical Field

This invention is directed towards regenerative heat pump system and method using a working fluid or refrigerant and an adsorbent material.

2. Discussion of the Invention

Heat pumps using solid adsorbent beds are known as shown by U.S. Pat. No. 4,610,148, U.S. Pat. No. 4,637,218 and U.S. Pat. No. 4,694,659 which use zeolite as the adsorbent and water as the working fluid. In general since adsorbents take up the working fluid when cooled and desorb the working fluid when heated, adsorbent heat pumps are said to be heat driven. Often in adsorbent heat pumps two beds of sorbents are used, one to adsorb the working fluid while the other bed is desorbing the working fluid. Alternate heating and cooling of the beds is the conventional procedure. When used in air conditioning, heat from an interior room may be used to evaporate the working fluid in an evaporator with heat rejection to the environment at ambient temperatures.

In all of such systems the efficiency of the apparatus is measured by its coefficient of performance or "COP". By the term "COP" as used herein is meant the ratio of heating or cooling work performed divided by the amount of power required to do the work. Since cooling $COP_S$, or $COP_{CS}$, are generally lower than heating $COP_S$, or $COPM_S$, many systems are rated on their cooling $COP_S$.

U.S. Pat. No. 4,637,218 mentions cooling $COP_S$ between 1 and 2 and heating $COP_S$ between 2 and 3 both of which are apparently ideal values since it is later stated that in practice for the heating mode the COP is less but with proper design is nevertheless within about 80% of the theoretical value, that is, about 2.4. In U.S. Pat. No. 4,637,218 a hot coolant is pumped from a hot 204.4° C. sorbent compressor to a cooler 37.8° C. sorbent compressor, while at the same time cold coolant is pumped from the cooler sorbent compressor to the hotter sorbent compressor. Both compressors exchange heat yielding a typical heat regeneration efficiency of about 80%. The remainder of the heat is supplied by a boiler at about 204° C. Water vapor as the working fluid is desorbed from the hot sorbent at, a relatively high pressure while the cold sorbent adsorbs the working fluid at a relatively low pressure. Expansion of the working fluid from the higher pressure to the lower pressure creates net cooling at 4.4° C.

U.S. Pat. No. 4,610,148 reports a theoretical heating COP of about 3 and a cooling COP of about 2, and, a calculated operating $COP_H$ of about 2.6 and a calculated operating $COP_C$ of about 1.6.

FIG. 3 of U.S. Pat. No. 4,694,659, which is concerned with a dual sorbent bed heat pump, shows heating and cooling COP's as a function of a dimensionless thermal wavelength parameter which at a value of about 0.5 corresponds to a heating COP of about 2.7 and a cooling COP of about 1.7.

Cryogenic cooler systems for sorption refrigerators using a sorption compressor, a heating/cooling loop and a Joule-Thomson expansion valve, or "J-T" valve, with methane as a refrigerant gas and charcoal as the adsorbent, are disclosed in articles entitled "High Efficiency Sorption Refrigerator Design", and "Design and Component Test Performance of an Efficient 4 W, 130 K Sorption Refrigerator" in Advances In Cryogenic Engineering, Vol. 35, Plenum Press, New York, 1990. Desorption occurs at 4.46 MPa (646 psia), i.e. $P_H$, and adsorption at 0.15 MPa (22 psia), i.e. $P_L$, or a pressure ratio of about 30, i.e, $P_H/P_L=30$. Methane is expanded from 4.46 MPa to 0.15 MPa to achieve cooling below 130K (−143° C.). The sorbent is heated from 240K (−33° C.) to 600K (327° C.) to desorb the methane. However based on data from another source it has been noted that for this cryogenic cooler system the sorbent must be heated from 240K to 415K (142° C.) before any methane is desorbed, and the sorbent must be cooled from 600K (327° C.) to 320K (47° C.) before any methane is adsorbed. The temperature ranges with high thermal capacitance, which accounts for the heat of adsorption, during heating is from 415K to 800K, and during cooling is from 320K to 240K. Since the heating high thermal capacitance temperature range does not overlap the cooling high thermal capacitance temperature range, none of the heat of adsorption can be recovered for use in the system, and as a consequence the heat of adsorption must be rejected entirely from the system. In the above mentioned methane/charcoal cryogenic refrigerator, the system's high pressure ratio of about 30 essentially precludes regeneration of the heat of adsorption. Usually in systems with high pressure ratios, i.e. $P_H/P_L$ ratios over about 10, none of the heat of adsorption can be regenerated. By the term "sensible heat" as used herein is meant the "mass" times "specific heat" times "temperature change". Therefore unless otherwise specified, the term "sensible heat" as used herein does not include latent heat or heat of adsorption.

In order to improve system efficiency and $COP_S$ it therefore would be desirable to regenerate at least a portion of the heat of adsorption.

SUMMARY OF THE INVENTION

It is an objective of this invention to provide a system and process improving the efficiency of regenerative sorbent heat pump operations. It is also an object of this invention to provide a system and process for regenerating at least a portion of the heat of .adsorption. Another object of this invention is to provide a regenerative sorbent heat pump system and process having an enhanced coefficient of performance. Still another object of this invention is to provide a regenerative sorbent heal pump system and process which can be used for cooling rooms of a building. Yet another object of this invention is to provide such systems and processes which can operate using working fluids or refrigerants having very low or no atmospheric ozone-depletion-potential or "ODP". It is a further object of this invention to provide a system which can be used for heating and cooling rooms and buildings in which the heating can be for comfort or space heating in the winter or for producing hot water year around.

Accordingly there is provided by the principles of this invention a regenerative sorbent heat pump process for cooling a chamber, room or an interior space and for simultaneously regenerating at least a portion of the heat of adsorption. This invention comprises confining a sorbent in a plurality of compressor zones, the number of compressor zones being at least four; continuously introducing a working fluid vapor from an evaporation zone into at least one of the number of compressor zones and sorbing the working fluid vapor on the sorbent therein over a predetermined first or adsorption temperature range and a predetermined first (low) pressure or $P_L$; continuously desorbing working fluid vapor from the sorbent in at least one of the remaining number of compressor zones and removing working fluid vapor therefrom over a predetermined second or desorption temperature range which is higher than the predetermined first temperature or adsorption range and at a predetermined second (high) pressure or $P_H$ which is higher than the predetermined first pressure. A part of the predetermined first or adsorption temperature range overlaps a part of the predetermined second of desorption temperature range. The process further comprises continuously condensing working fluid vapor removed from at least one of the remaining number of the compressor zones at $P_H$ and transferring heat from the working fluid to the environment thereby forming a working fluid liquid; and continuously evaporating the working fluid liquid and forming the working fluid vapor in the evaporation zone at $P_L$ by transferring heat from an interior space to the evaporation zone thereby cooling the interior space. Evaporation of the working fluid liquid can comprise passing it across an expansion valve. The process also comprises continuously circulating a heat transfer fluid in series flow through the compressor zones and preventing the heat transfer fluid from directly contacting the sorbent; and continuously removing heat from the heat transfer fluid and transferring it to the environment. The process includes adding heat from a heat source to a predetermined one of the compressor zones over a predetermined period of time; repeating the last mentioned adding heat step sequentially in each of the compressor zones; continuously indirectly transferring heat from the sorbent in the compressor zones which are sorbing working fluid vapor to the heat transfer fluid and from the heat transfer fluid to the sorbent in the compressor zones which are desorbing working fluid vapor thereby regenerating heat; and, maintaining the $P_H/P_L$ ratio sufficiently low and the temperature overlap of the sorbing and desorbing operation sufficiently large so that at least a portion of the heat of adsorption is regenerated.

In one embodiment the process further comprises maintaining the $P_H/P_L$ ratio between about 1.1 and about 10, preferably between about 1.1 and about 5, and especially between about 1.1 and about 3. In one embodiment the process further comprises maintaining the $P_H/P_L$ ratio sufficiently low that about 25% of the heat of adsorption is regenerated, preferably sufficiently low that about 50% of the heat of adsorption is regenerated, more preferably sufficiently low that about 70% of the heat of adsorption is regenerated, and especially preferably sufficiently low that about 100% of the heat of adsorption is regenerated.

In one embodiment the predetermined first or adsorption temperature range is from at least about −18° C. (0° F.) to no more than about 204° C. (400° F.), the predetermined second or desorption temperature range is from at least about 38° C. (100° F.) to no more than about 427° C. (800° F.), and, the adsorption and desorption temperature ranges overlap at least about 28 Celsius (50 Fahrenheit) degrees. In another embodiment the predetermined first or adsorption temperature range is from at least about −18° C. (0° F.) to no more than about 204° C. (400° F.), the predetermined second or desorption temperature range is from at least about 38° C. (100° F.) to no more than about 316° C. (600° F.), and, the adsorption and desorption temperature ranges overlap at least about 56 Celsius (100 Fahrenheit) degrees. In a preferred embodiment the predetermined first temperature range is from at least about −18° C. (0° F.) to no more than about 204° C. (400° F.) the predetermined second temperature range is from at least about 38° C. (100° F.) to no more than about 260° C. (500° F.), and, the adsorption and desorption temperature ranges overlap at least about 56 Celsius (100 Fahrenheit) degrees. In an especially preferred embodiment the predetermined first temperature range is from at least about 10° C. (50° F.) to no more than about 177° C. (350° F.), the predetermined second temperature range is from at least about 38° C. (100° F.) to no more than about 232° C. (450° F.), and, the adsorption and desorption temperature ranges overlap at least about 83 Celsius (150 Fahrenheit) degrees.

In one embodiment the continuous removal of heat from the heat transfer fluid and transferring it to the environment comprises continuously removing heat from the heat transfer fluid before it flows to a predetermined one of the compressor zones and transferring the removed heat to the environment. In a further embodiment the process comprises repeating the last mentioned heat removal step sequentially for each of the compressor zones.

In one embodiment the continuous removal of heat from the heat transfer fluid and transferring it to the environment comprises continuously indirectly transferring heat from the first mentioned heat transfer fluid before it flows to a predetermined one of the compressor zones to a second heat transfer fluid, and continuously removing heat from a second heat transfer fluid by transferring heat to the environment. In a further embodiment the process comprises repeating the last mentioned heat removal step sequentially for each of the compressor zones.

In still another embodiment the adding heat from a heat source to a predetermined one of the compressor zones over a predetermined period of time is performed by adding heat to a third heat transfer fluid, and, indirectly transferring heat from the third heat transfer fluid to the first heat transfer fluid before it enters the predetermined one of the compressor zones.

There is also provided by the principles of this invention a regenerative sorbent heat pump system comprising a working fluid being operable for being sorbed by a sorbent; a plurality of spaced apart compressors. The number of compressors being at least four. Each of the compressors has a sorbent contained within the compressor, an inlet for introducing the working fluid for adsorption by the sorbent, an outlet for removing working fluid desorbed from the sorbent, and a heat conductive passageway having an inlet and an outlet. The heat conductive passageway is for flowing a heat transfer fluid through the compressor and for indirectly transferring heat between the sorbent and the heat transfer fluid without the heat transfer fluid being in contact with the sorbent. The system further comprises means for removing high temperature, high pressure working fluid vapor from each of the compressors; condensing means for transferring heat from the working fluid to the environment or a low temperature heat sink, and, for condensing working fluid vapor to form a low temperature, high pressure working fluid liquid. The system also comprises evaporating means for converting low temperature, high pressure working fluid liquid to low temperature, low pressure working fluid vapor, and, for transferring heat from a low temperature source external of the system, including rooms of a building, to the working fluid. Also included is liquid conveying means for conveying low temperature, high pressure working fluid liquid from the condensing means to the evaporating means; and, vapor conveying means for conveying low temperature, low pressure working fluid vapor into each of the compressors. The system has a plurality of indirect heat exchange means spaced apart from the compressors. The number of indirect heat exchange means being equal to the number of the compressors. Each of the indirect heat exchange means has a first channel for flowing a heat transfer fluid, and a second channel for flowing another heat transfer fluid. The channels being isolated from fluid communication with each other. The first channel being in heat conductive communication with the second channel. Each of the channels has an inlet and an outlet. The system also includes a train formed by connecting in alternating order, the first channels of the indirect heat exchange means to the heat conductive passageways. The train has a train inlet the inlet of the first channel of the first-in-the-series of indirect heat exchange means of the train, and, as a train outlet the outlet of the heat conductive passageway of the last-in-the-series of compressors of the train, the system also has first pumping means for pumping a first heat transfer fluid around the first train. The outlet of the first pumping means being connected to the train inlet and the train outlet being connected to the first pumping means inlet. The system includes second pumping means for conveying a second heat transfer fluid; connecting means for connecting the outlet of the second pumping means to the inlet of the second channel of each of the internal heat exchange means, and for connecting the outlet of each of the second channels thereof to the second pumping means inlet. Also included is flow control means for directing the second heat transfer fluid from the second pumping means to the second channel of a predetermined one of the indirect heat exchange means in a predetermined order thereby defining a flow cycle, and, thereby enabling heat transfer between the first heat transfer fluid in the first channel thereof and the second heat transfer fluid in the second channel thereof. Also included is primary heating means for heating each of the compressors; and heat control means for controlling the heating period of the primary heating means in each of the compressors thereby defining a heating cycle. Heat discharge means is included for transferring heat from the second heat transfer fluid flowing in the connecting means from the second channels to the second pump means, to the environment or a low temperature heat sink thereby providing a regenerative sorbent heat pump system.

In a further embodiment the system the further comprises heat exchanger means for the indirect transfer of heat between the low temperature, high pressure working fluid liquid in the liquid conveying means and the low temperature, low pressure working fluid vapor in the vapor conveying means.

In another embodiment the system further comprises means for coordinating the flow cycle and the heating cycle.

In still another embodiment the system also comprises auxiliary heat exchanger means for indirectly exchanging heat between the heat transfer fluid flowing to the train and the heat transfer fluid flowing from the train. The system can also have means for transferring heat from the heat transfer fluid flowing from the train to a low temperature heat sink or to the environment.

In one embodiment the primary heating means comprises a heating device in each of the compressors. In another embodiment the primary heating means comprises a heating device between each of the compressors in the train and between the first pumping means outlet and the train inlet. These heating devices are for heating the first heat transfer fluid before it is introduced into the compressor for which it is intended, so that the thusly heated heat transfer fluid thereby heats its intended compressor.

In another embodiment the primary heating means comprises a plurality of second indirect heat exchange means spaced apart from the compressors. The number of second indirect heat exchange means being equal to the number of the compressors. Each of the second indirect heat exchange means having a first channel for flowing a heat transfer fluid, and a second channel for flowing a heat transfer fluid. The channels thereof are isolated from fluid communication with each other. The first channel thereof being in heat conductive communication with the second channel thereof. Each of the channels thereof having an inlet and an outlet. In this embodiment the train includes the first channels of the second indirect heat exchange means connected, relative to the heat conductive passageways, in alternating order before each of the heat conductive passageways. This embodiment also includes third pumping means for pumping a third heat transfer fluid; second connecting means for connecting the outlet of the third pumping means to the inlet of the second channel of each of the second internal heat exchange means, and for connecting the outlet of each of the second channels thereof to the third pumping means inlet. Flow control means is also included for directing the third heat transfer fluid from the third pumping means to the second channel of a predetermined one of the second indirect heat exchange means in a predetermined order thereby defining a second flow cycle, and, thereby enabling heat transfer between the first heat transfer fluid in the first channel thereof and the third heat transfer fluid in the second channel thereof. The primary heating means also includes a heating device in the second connecting means for heating the third heat transfer fluid before it is introduced into the second channel of a predetermined one of the second indirect heat exchange means. The heat control means includes means for controlling the heating devices so that the temperature of the third heat transfer fluid is controlled.

In still another embodiment the pumping means conveys the heat transfer fluid through a cooling loop and then through the train of heat conductive passageways and first channels of the indirect heat exchange means thereby cooling the compressors.

In one embodiment the pumping means divides the flow of heat transfer fluid between a coolant loop and the train of heat conductive passageways.

In yet another embodiment of this invention the system comprises first connecting means for forming a loop of heat conductive passageways by connecting the outlet of one heat conductive passageway to the inlet of another heat conductive passageway and proceeding with such inlet-to-outlet connections until the outlet of the last heat conductive passageway is connected to the inlet of the first heat conductive passageway thereby forming a loop of heat conductive passageways. This embodiment includes second connecting means for connecting the outlet of the pumping means to the inlet of each of the heat conductive passageways; and third connecting means for connecting the outlet of each of the heat conductive passageways to the pumping means inlet. Additional flow control means is also included for directing the heat transfer fluid from the pumping means to the inlet of a predetermined one of the heat conductive passageways, then around the loop passing through each of the heat conductive passageways only once, and then back to the pumping means. This embodiment also includes phase timing means for redirecting the heat transfer fluid after a predetermined time interval, from the pumping means to another one of the heat conductive passageways thereby beginning a new phase, and for repeating such redirecting after such predetermined time intervals to other of the heat conductive passageways, until the heat transfer fluid is directed from the pumping means to each of the heat conductive passageways thereby completing a flow cycle. Heat discharge means is included for transferring heat from the heat transfer fluid in the third connecting means to the environment or a low temperature heat sink.

In one embodiment the working fluid is selected from the group consisting of fluorine substituted ethanes, and, fluorine and chlorine substituted ethanes. In another embodiment the working fluid is selected from the group consisting of 1,1,1,2-tetrafluoroethane or $CF_3CH_2F$ referred to herein as "R134a" 2-chloro-1,1,1,2-tetrafluoroethane or $CF_3CHClF$ referred to herein as "R124", 1,1-dichloro-2,2,2-trifluoroethane or $CHCl_2CF_3$ referred to herein as "R123", ammonia and water.

In one embodiment the sorbent is selected from the group consisting of activated carbons, zeolites, silica gels and alumina. A preferred activated carbon is known as AX-21.

In one embodiment the heat transfer fluid is selected from the group consisting of mixtures of diphenyl and diphenyl oxide, ortho-dichlorobenzene, ethylene glycol, methoxypropanol, and water. Examples of such heat transfer fluids are the Dowtherm TM fluids.

In one embodiment the number of compressor zones is four, and in a preferred embodiment the number of compressor zones is six. However, any number of compressors can be used if desired as long as the number is at least four.

In one embodiment the process and system mat be used only for compressing fluids, or only for separating mixed fluid constituents, but without necessarily pumping heat from a lower temperature heat source to a higher temperature heat source. Accordingly there is also provided by the principles of this invention a regenerative sorbent heat pump process for compressing a fluid and for simultaneously regenerating at least a portion of the heat of adsorption comprising confining a sorbent in a plurality of compressor zones, the number of compressor zones being at least four; introducing a working fluid vapor from an evaporation zone into at least one of the number of compressor zones and sorbing the working fluid vapor on the sorbent therein over a predetermined first temperature range and a predetermined first pressure or $P_L$; desorbing working fluid vapor from the sorbent in at least one of the remaining number of compressor zones and removing working fluid vapor therefrom over a predetermined second temperature range which is higher than the predetermined first temperature range and at a predetermined second pressure or $P_H$ which is higher than the predetermined first pressure, a part of the predetermined first temperature range overlapping a part of the predetermined second temperature range; circulating a heat transfer fluid in series flow through the compressor zones and preventing the heat transfer fluid from directly contacting the sorbent; removing heat from the heat transfer fluid and transferring it to the environment; adding heat from a heat source to a predetermined one of the compressor zones over a predetermined period of time; repeating the adding heat step sequentially in each of the compressor zones; indirectly transferring heat from the sorbent in the compressor zones which are sorbing working fluid vapor to the heat transfer fluid and from the heat transfer fluid to the sorbent in the compressor zones which are desorbing working fluid vapor thereby regenerating heat; and, maintaining the $P_H/P_L$ ratio sufficiently low so that at least a portion of the heat of adsorption is regenerated.

DESCRIPTION OF THE PREFERRED EMBODIMENTS

Figure 1:
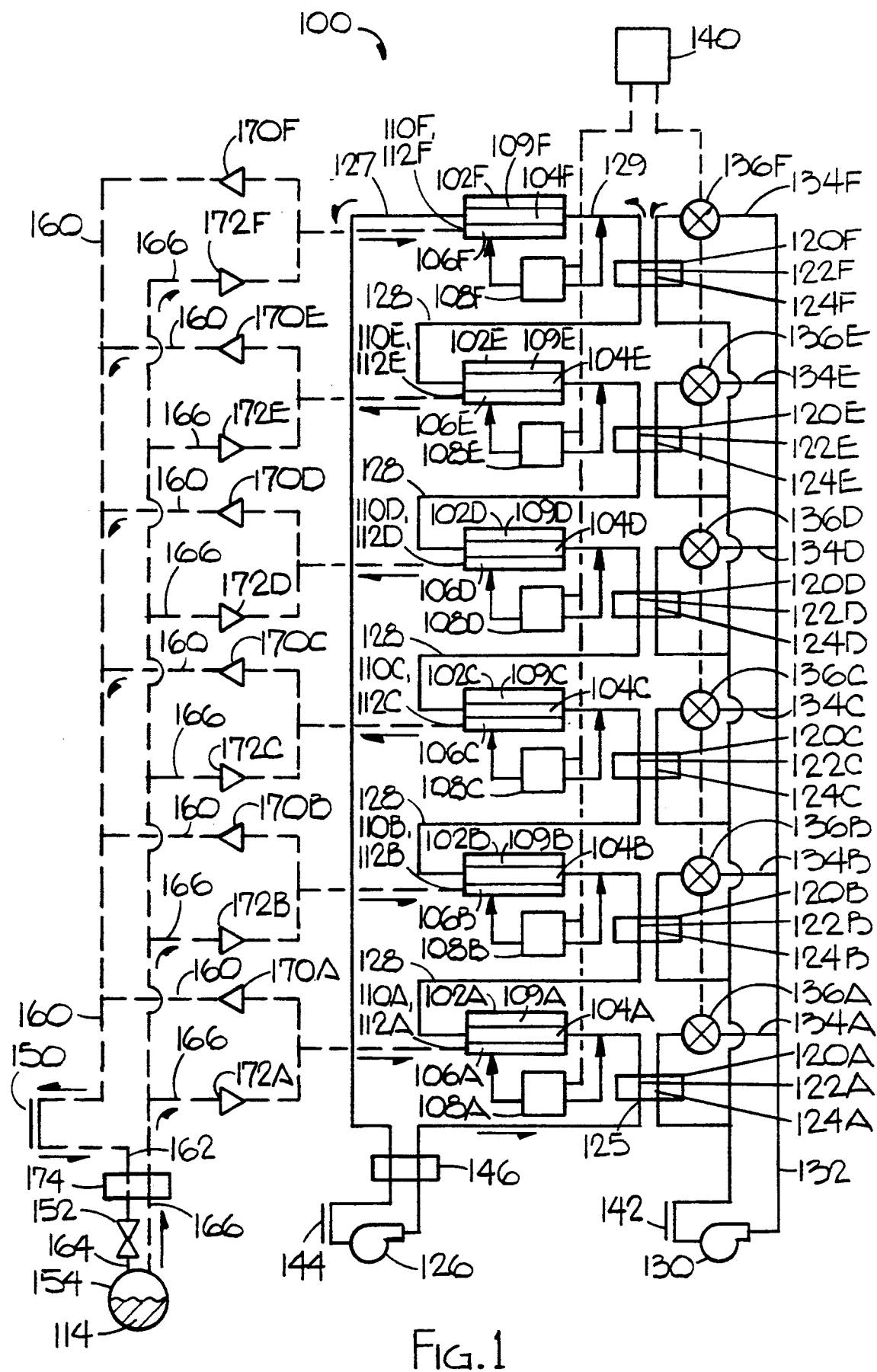
FIG. 1 is a diagram of a first embodiment of this invention having a train of six compressors and coolant loop.

Referring to FIG. 1, a block diagram for a regenerative sorbent heat pump system, generally designated by numeral 100, is shown for air conditioning, i.e. room heating and cooling. The system has six compressors 102A, 102B, 102C, 102D, 102E and 102F, having heat conductive passageways 104A, 104B, 104C, 104D, 104E and 104F, respectively, sorbent chambers 106A, 106B, 106C, 106D, 106E and 106F, respectively, and, chamber heating devices 108A, 108B, 108C, 108D, 10BE and 108F, respectively. The heat conductive passageways 104A–F are hermetically separated from chambers 106A–F, respectively. Chambers 106A–F contain a sorbent 109A, 109B, 109C, 109D, 109E and 109F, respectively, inlets 110A, 110B, 110C, 110D, 110E and 110F, respectively, for introducing a working fluid or refrigerant 114 into the chamber for sorption by the sorbent, and outlets 112A, 112B, 112C, 112D, 112E and 112F, respectively, for removing the working fluid 114 desorbed by the sorbent from the chamber. The working fluid is sorbed or desorbed from the sorbent in a chamber depending on the temperature and pressure of the sorbent in the chamber. The temperature of the sorbent in each chamber is adjusted by the chamber heating devices 108A, 108B, 108C, 108D, 10BE and 108F and the temperature of the heat transfer fluid, sometimes referred to herein as the first heat transfer fluid, flowing through the chamber heat conductive passageways 104A–F. Heating devices 108A–F can heat compressors 102A–F directly or can heat the heat transfer fluid flowing into heat conductive passageways 104A–F the latter being preferred. The working fluid used in this example is 1,1,1,2-tetrafluoroethane generally referred to as R134a. However, other working fluids can be used if desired.

For each of the compressors 102A–F there is a corresponding indirect heat exchanger 120A, 120B, 120C, 120D, 120E and 120F, respectively having first channels 122A, 122B, 122C, 122D, 122E and 122F, respectively, and second channels 124A, 124B, 124C, 124D, 124E and 124F, respectively, which are hermetically separated from first channels 122. Pump 126, sometimes referred to herein as the first pumping means, conveys the first heat transfer fluid first into channel 122A, then into passageway 104A, then into channel 122B, then into passageway 104B, then into channel 122C, then into passageway 104C, then into channel 122D, then into passageway 104D, then into channel 122E, then into passageway 104E, then into channel 122F, then into passageway 104F, and then back to pump 126 whereupon the first heat transfer fluid is continuously recycled. As a consequence of the in series connecting of the first channels 122 to heat conductive passageways 104 a train 128 of heat conductive passageways 104 is formed having a train inlet 125, which is also the inlet of first channel 122A, and a train outlet 127, which is also the outlet of heat conductive passageway 104F. In embodiment 100 it should be noted that the order of heat conductive passageways 104 and first channels 122 always remains the same thereby eliminating the need for costly control valves in the loop 129 which comprises train 128 and pump 126. This provides a cost saving and increased reliability over systems requiring additional control valves.

Pump 130, sometimes referred to herein as the second pump means, pumps a heat transfer fluid, sometimes referred to herein as the second heat transfer fluid, through coolant loop 132 which contains six parallel branches 134A, 134B, 134C, 134D, 134E and 134F containing control valves 136A, 136B, 136C, 136D, 136E and 136F, respectively, and second channels 124A–F, respectively, of indirect heat exchangers 120A–F, respectively. Valves 136A–F are controlled by controller 140 so that only one of valves 136A–F is open at a time thereby permitting the second heat transfer fluid to flow through only one of second channels 124A–F at a time.

Before returning to pump 130, the second heat transfer fluid is cooled by radiator 142 to about 38° C. (100° F.) and then continuously circulated around coolant loop 132 so that the active second channel always receives the second heat transfer fluid at a temperature of about 38° C. (100° F.). Radiator 142 transfers heat from the second heat transfer fluid to the outside in the summer, and to the room or zone to be heated in the winter in a conventional manner. In FIG. 1 valve 136F is open and all the other valves, i.e. valves 136A–E, are closed. FIG. 1 represents phase 1 of six phases as will be explained in greater detail later. In the system of FIG. 1 it is to be noted that only one control valve 136 per compressor is required for the second heat transfer fluid of the system, which provides a cost saving advantage to that of systems having two or more control valves per compressor.

Heating devices 108A–F, sometimes referred to herein as the primary heating means, are also controlled by controller 140 so that only one of the heating devices is heating at a time for a predetermined period of time and the remaining heating devices are in active, thereby defining a heating cycle. In the following discussion the temperatures are based on the use of R134a as the working fluid, and the temperature cycle shown in FIG. 3 which is discussed in greater detail later. In FIG. 1, which depicts phase 1, heating device 108C is active and heating the first heat transfer fluid to a temperature of about 204° C. (400° F.) thereby heating the sorbent in chamber 106° C. to about 204° C. (400° F.). Heating devices 108 add heat to the system at a high temperature, i.e. the heating devices increase the temperature of the first heat transfer fluid from about 188° C. (370° F.) to about 204° C. (400° F.). In phase 1 the remaining heating devices 106A,B,D–F are not heating their respective compressors 102A,B,D–F, respectively. In FIG. 1 the first heat transfer fluid flowing through the train 128 is also heating the sorbent in chamber 106D and 106E, and at the same time also cooling the sorbent in chambers 106A, 106B and 106F the combination of which regenerates system heat thereby providing for higher COP's. As mentioned earlier, in FIG. 1 the second heat transfer fluid is flowing through the second channel 124F of indirect heat exchangers 120F and thereby cooling the first heat transfer fluid flowing through the first channel 122F of indirect heat exchangers 120F. The thusly cooled first heat transfer fluid then flows through heat conductive passageway 104F thereby cooling the sorbent 109F in chamber 106F to a temperature between about 38° C. (100° F.) to about 54° C. (130° F.).

With valve 136F open for cooling the sorbent 109F in chamber 106F, and heating device 108C activated for heating sorbent 106C in chamber 106C, the calculated temperature profiles of the sorbent in chambers 106A–F are as follows, with the first mentioned temperature corresponding to the sorbent temperature nearest the inlet of its heat conductive passageway 104, and the second mentioned temperature corresponding to the sorbent temperature nearest the outlet of the heat conductive passageway:

| Compressor | (°C.) | (°F.) |
| --- | --- | --- |
| 102A | 54–129 | 130–265 |
| 102B | 129–177 | 265–350 |
| 102C | 204–188 | 400–370 |
| 102D | 188–104 | 370–220 |

| Compressor | (°C.) | (°F.) |
| --- | --- | --- |
| 102E | 104–60 | 220–140 |
| 102F | 38–54 | 100–130 |

Figure 2:
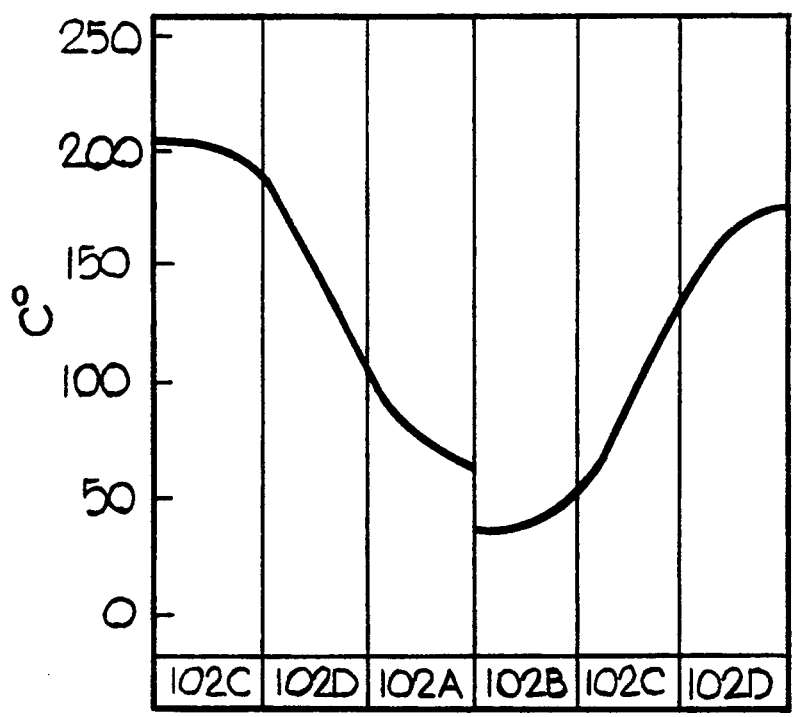
FIG. 2 is a calculated temperature profile of the six compressors of the embodiment of FIG. 1.

The above calculated temperature profiles of the first heat transfer fluid as it flows through train 128 of compressors is shown in FIG. 2 which is a computerized simulation of the system and process. The above profile pertains to a first phase, i.e. phase 1, in the operation of the system of embodiment 100. In general the total number of phases will be equal to the number of compressors. For the system of FIG. 1 the number of phases are six which, when completed, defines a cycle. When a phase is completed the next phase begins and the temperature profiles in the compressors shift as follows:

Phase 2, valve 136A open and heating device 108D heating:

| Compresssor | (°C.) | (°F.) |
| --- | --- | --- |
| 102B | 54–129 | 130–265 |
| 102C | 129–177 | 265–350 |
| 102D | 204–188 | 400–370 |
| 102E | 188–104 | 370–220 |
| 102F | 104–60 | 220–140 |
| 102A | 38–54 | 100–130 |

Phase 3, valve 136B open and heating device 108E heating:

| Compresssor | (°C.) | (°F.) |
| --- | --- | --- |
| 102C | 54–129 | 130–265 |
| 102D | 129–177 | 265–350 |
| 102E | 204–188 | 400–370 |
| 102F | 188–104 | 370–220 |
| 102A | 104–60 | 220–140 |
| 102B | 38–54 | 100–130 |

Phase 4, valve 136C open and heating device 108F heating:

| Compressor | (°C.) | (°F.) |
| --- | --- | --- |
| 102D | 54–129 | 130–265 |
| 102E | 129–177 | 265–350 |
| 102F | 204–188 | 400–370 |
| 102A | 188–104 | 370–220 |
| 102B | 104–60 | 220–140 |
| 102C | 38–54 | 100–130 |

Phase 5, valve 136D open and heating device 108A heating:

| Compresssor | (°C.) | (°F.) |
| --- | --- | --- |
| 102E | 54–129 | 130–265 |
| 102F | 129–177 | 265–350 |
| 102A | 204–188 | 400–370 |
| 102B | 188–104 | 370–220 |
| 102C | 104–60 | 220–140 |
| 102D | 38–54 | 100–130 |

Phase 6, valve 136E open and heat device 108B heating:

| Compressor | (°C.) | (°F.) |
| --- | --- | --- |
| 102F | 54–129 | 130–265 |
| 102A | 129–177 | 265–350 |
| 102B | 204–188 | 400–370 |
| 102C | 188–104 | 370–220 |
| 102D | 104–60 | 220–140 |
| 102E | 38–54 | 100–130 |

When phase 6 is completed the cycle is completed and a new cycle begins with phase 1; and, the control valve phases, the heating device activation phases, and the phase temperature profiles repeat as set forth above. The above temperatures are based on the use of R134a as the working fluid using the cycle shown in FIG. 3. Other working fluids can be used and the temperatures will vary with the particular working fluid chosen. The working fluid should be chosen with the end use in mind. For air conditioning of rooms and buildings R134a and R124 are preferred because of their useful operating temperature ranges and low $ODP_S$.

For longer pump life, it is desirable to maintain a constant lower temperature at pump 126. This can be achieved by including a radiator 144 after the outlet of train 128 for rejecting heat from the first heat transfer fluid to the environment and/or auxiliary heat exchanger 146 for exchanging heat between the first heat transfer fluid flowing from train 128 to pump 126 and the first heat transfer fluid flowing from pump 126 to the inlet of train 128. It should be understood that radiator 144 and auxiliary heat exchanger 146 are optional.

The working fluid or refrigerant side of embodiment 100 contains condenser 150 which provides means for transferring heat from the working fluid to the environment in the summer or to the room or zone in the winter, and, means for condensing high temperature, high pressure working fluid vapor from the compressors to form a low temperature, high pressure working fluid liquid. The working fluid side also contains Joule-Thomson expansion valve 152 which provides means for converting low temperature, high pressure working fluid liquid to low temperature, low pressure working fluid liquid and gas, evaporator 154 which provides means for converting low temperature, low pressure working fluid liquid to low temperature, low pressure working fluid vapor and for accepting heat from a low temperature source such as a room or zone in the summer thereby providing comfort cooling, or from the environment in the winter. Conduits 160 provides means for conveying high temperature, high pressure working fluid vapor from compressors 102 to condenser 150. Conduit 162 provides liquid conveying means for conveying low temperature, high pressure working fluid liquid from condenser 150 to J-T valve 152. Conduit 164 provides liquid conveying means for conveying low temperature, low pressure working fluid liquid from J-T valve 152 to evaporator 154. Conduit 166 provides vapor conveying means for conveying low temperature, low pressure working fluid vapor from evaporator 154 to compressors 102.

Conduit 160 contains check valves 170A–F which permit high pressure working fluid vapor to flow from compressors 102 to condenser 150 while preventing high pressure vapor from flowing into compressors 102 which are under a low pressure. Conduit 166 contains check valves 172A–F which permit low pressure working fluid vapor to flow into compressors 102 which are under a low pressure while preventing such vapor from flowing into compressors which are under a higher pressure. In FIG. 1, which represents phase 1 of the cycle, working fluid is being desorbed in compressors 102C–E, and, high temperature, high pressure desorbed working fluid vapor is flowing through check valves 170C–E to condenser 150; while low temperature, low pressure working fluid vapor is flowing from evaporator 114 through conduit 166 and check valves 172A,B,F into compressors 102A,B,F. The high pressure in conduit 160 prevents check valves 170A,B,F from opening. The high pressure in compressors 102C–E prevents check valves 172C–E from opening. Therefore no solenoid control valves are required for the working fluid side and consequently the temperature of the compressors alone determines flow of working fluid to and from the compressors.

To improve the efficiency of embodiment 100, the working fluid side can also include heat exchanger 174 for exchanging heat between the working fluid liquid in conduit 162 and the working fluid vapor in conduit 166.

The system of embodiment 100 was evaluated by computer simulation for use as an air conditioner/heat pump. The computer model was based on an activated carbon sorbent known as AX-21. AX-21 sorbent was chosen because of its extremely high BET surface area which is over 2000 m$^2$/gm. Working fluids or refrigerants chosen for testing were 1,1,1,2-tetrafluoroethane known as R134a, and 2-chloro-1,1,1,2-tetrafluoroethane known as R124. These working fluids are preferred because they are believed to be nontoxic, non-flammable, and have high working vapor pressures. Furthermore R134a and R124 have a very low ozone-depletion-potential ("ODP"). The ODP for R134a is 0.0 and for R124 is less than 0.05 as opposed to an ODP for dichlorodifluoromethane, known as R12, of 1.0. Another useful working fluid for all embodiments of this invention is dichlorotrifluoroethane, referred to as R123, will also have high COP$_S$ while remaining nontoxic, non-flammable with a low ODP.

Figure 3:
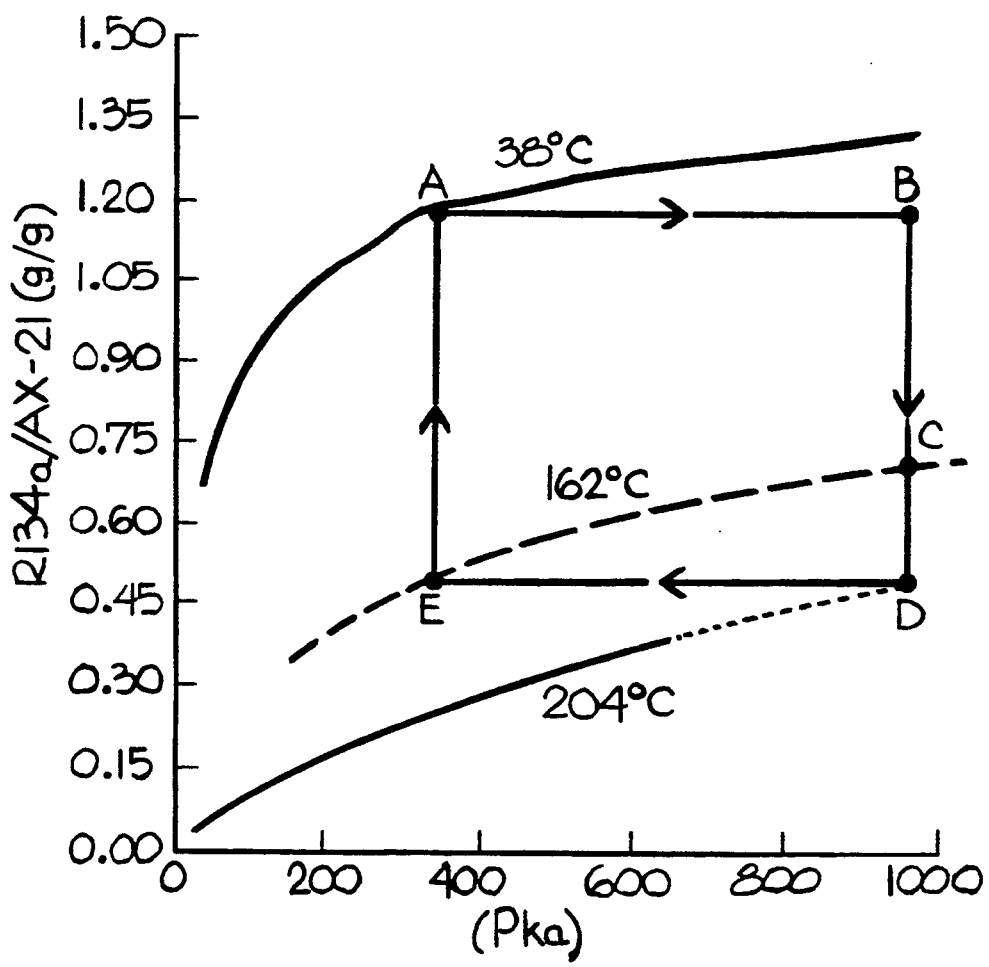
FIG. 3 is isotherm data for R134a/AX-21 carbon sorbent system.
Figure 4:
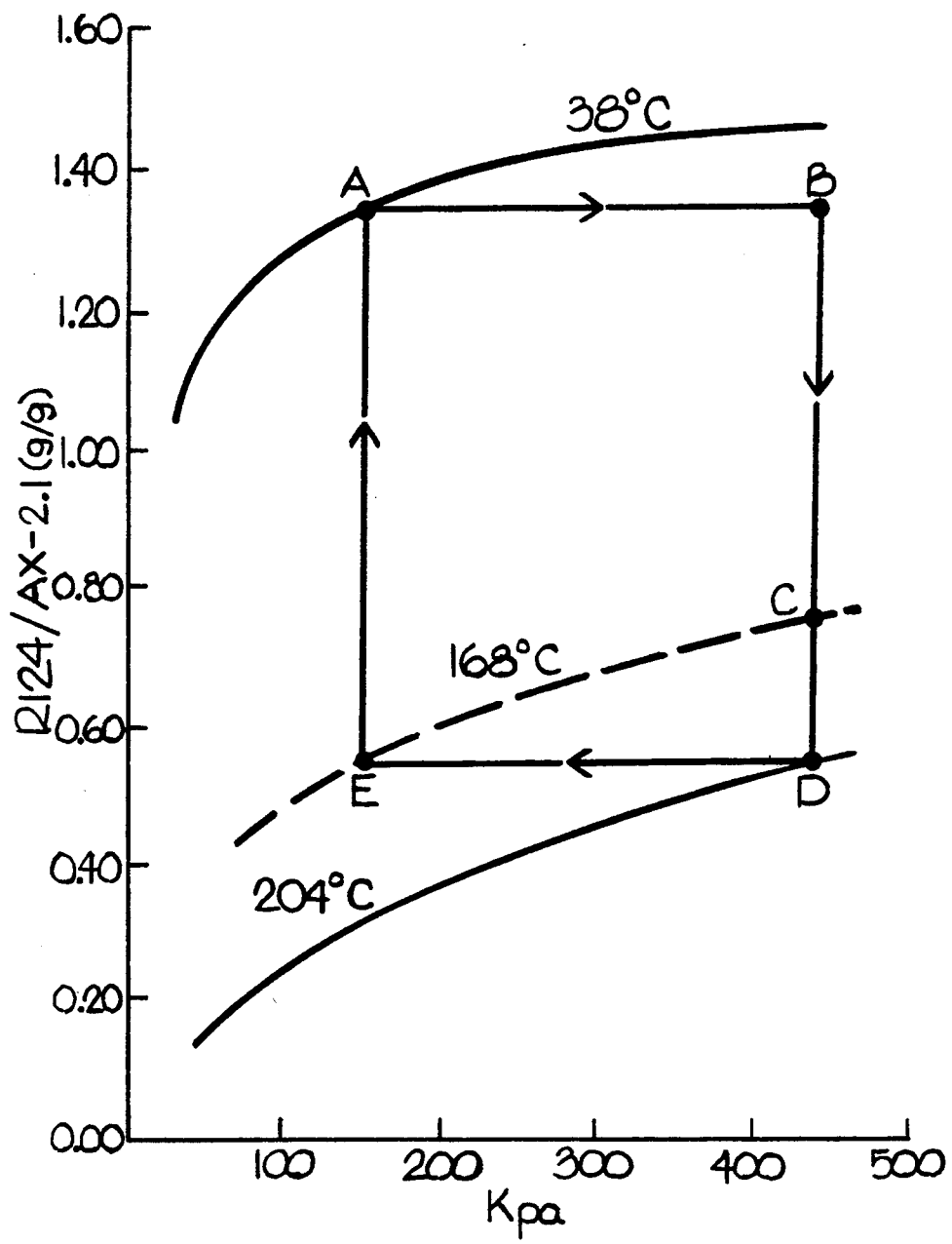
FIG. 4 is isotherm data for R124/AX-21 carbon sorbent system.

The isotherm data for R134a and R124 on AX-21 carbon was measured and is shown in FIGS. 3 and 4, respectively.

R134a/AX-21 Cycle

For the cycle shown in FIG. 3, the adsorption system is heated from 38° C. (100° F.), point A, to 63° C. (146° F.), point B, thereby pressurizing the system from a low pressure or P$_L$ of 335 kpa (48.5 psia) to a high pressure or P$_H$ of 964 kpa (139.7 psia). When heated an additional amount from 63° C. (146° F.), point B, to 204° C. (400° F.), point D, R134a is desorbed from the carbon sorbent at a constant high pressure of 964 kpa (139.7 psia). During cooling from 204° C. (400° F.), point D, to 162° C. (324° F.), point E, the system pressure is reduced without adsorbing significant amounts of R134a. When the system is further cooled from 162° C. (324° F.), point E, to 38° C. (100° F.), point A, R134a is adsorbed at a constant low pressure of 335 kpa (48.5 psia). In this example the pressure ratio, or P$_H$/P$_L$, of the cycle is about 2.9.

At high pressure, specifically 964 kpa (139.7 psia), R134a vapor is condensed at 38° C. (100° F.) thereby rejecting heat to a relatively low temperature heat sink, 38° C. (100° F.), such as the environment in the summer and the room interiors in the winter, or to a hot water system for tap water heating year around. When R134a is expanded to 335 kpa (48.5 psia), it cools to 4° C. (40° F.) thereby providing a 4° C. (40° F.) heat sink useful for cooling room interiors in summer or a heat sink for the acceptance of low temperature heat from the environment during the winter.

Because the embodiments of this invention are capable of regenerating up to about 99% of the sensible heat, the primary net heat required is that portion of the cycle where the thermal capacitance of the system, i.e. BTU/°F., is higher during heat-up than during cool-down. The thermal capacitance for FIG. 3 is high during heat-up 57° C. (134° F.) to 204° C. (400° F.) due to the added heat of desorption. The thermal capacitance for FIG. 3 is also high during cool-down 162° C. (324° F.) to 38° C. (100° F.) due to the added heat of adsorption. Therefore the only region where the heating thermal capacitance is significantly higher than the cooling thermal capacitance is during heating from 162° C. (324° F.), point C, to 204° C. (400° F.), point D; and the amount of R134a removed during such heating is about 0.694–0.482, or 0.212 gram of R134a per gram of carbon sorbent.

The heat of adsorption of R134a on AX-21 carbon sorbent has been measured and found to be about 9.5 Kcal/mole. The heat of refrigeration of R134a is known to be 4.7 kcal/mole. The total mass of R134a desorbed for the cycle shown in FIG. 3 is 1.187–0.482, or 0.705 grams of R134a per gram of AX-21 carbon sorbent. Therefore the total COP for cooling, or COP$_C$, can be as high as about (0.705×4.7)/(0.212×9.5), or about 1.65 for pumping heat from 4° C. (40° F.) at R134a to 38° C. (100° F.). That is for every watt of heat added at about 204° C. (400° F.), 1.65 watts can be ideally removed at 4° C. (40° F.). Since the 204° C. (400° F.) heat and the 4° C. (40° F.) heat are both removed from the system at 38° C. (100° F.), the total COP for heating, or COP$_H$, can be as high as about 1.65+1.0, or about 2.65. Based on the above, the fraction of the heat of adsorption which is regenerated is (0.705–0.212)/0.705 or about 0.70, i.e. about 70% of the heat of adsorption is regenerated.

R124/AX-21 Cycle

For the cycle shown in FIG. 4, the adsorption system is heated from 38° C. (100° F.), point A, to 58° C. (137° F.), point B, thereby pressurizing the system from a low pressure or P$_L$ of 153 kpa (22.2 psia) to a high pressure or P$_H$ of 434 kpa (62.9 psia). When heated an additional amount from 58° C. (137° F.), point B, to 204° C. (400° F.), point D, R124 is desorbed from the carbon sorbent at a constant high pressure of 434 kpa (62.9 psia). During cooling from 204° C. (400° F.), point D, to 168° C. (334° F.), point E, the system pressure is reduced without adsorbing significant amounts of R124. When the system is further cooled from 168° C. (334° F.), point E, to 38° C. (100° F.), point A, R124 is adsorbed at a constant low pressure of 153 kpa (22.2 psia). In this example the pressure ratio, or P$_H$/P$_L$, of the cycle is about 2.8.

At high pressure, specifically 434 kpa (62.9 psia), R124 vapor is condensed at 38° C. (100° F.) thereby rejecting heat to a relatively low temperature heat sink, 38° C. (100° F.), such as the environment in the summer and the room interiors in the winter, or to a hot water system for tap water heating year around. When R124 is expanded to 153 kpa (22.2 psia), it cools to 4° C. (40° F.) thereby providing a 4° C. (40° F.) heat sink useful for cooling room interiors in summer or a heat sink for the acceptance of low temperature heat from the environment during the winter.

Because the embodiments of this invention are capable of regenerating up to about 99% of the sensible heat, the primary net heat required is that portion of the cycle where the thermal capacitance of the system, i.e. BTU/°F., is higher duping heat-up than during cool-down. The thermal capacitance for FIG. 4 is high during heat-up 58° C. (137° F.) to 204° C. (400° F.) due to the added heat of desorption. The thermal capacitance for FIG. 4 is also high during cool-down 168° C. (334° F.) to 38° C. (100° F.) due to the added heat of adsorption. Therefore the only region where the heating thermal capacitance is significantly higher than the cooling thermal capacitance is during heating from 168° C. (334° F.), point C, to 204° C. (400° F.), point D; and the amount of R124 removed during such heating is about 0.752–0.550, or 0.202 gram of R124 per gram of carbon sorbent.

The heat of adsorption of R124 on AX-21 carbon sorbent has been measured and found to be about 10.7 Kcal/mole. The heat of refrigeration of R124 is known to be 4.4 kcal/mole. The total mass of R124 desorbed for the cycle shown in FIG. 4 is 1.352–0.550, or 0.802 grams of R124 per gram of AX-21 carbon sorbent. Therefore the total COP for cooling, or $COP_C$, can be as high as about $(0.802 \times 4.4)/(0.202 \times 10.7)$, or about 1.63 for pumping heat from 4° C. (40° F.) at R124 to 38° C. (100° F.). That is for every watt of heat added at about 204° C. (400° F.), 1.63 wants can be ideally removed at 4° C. (40° F.). Since the 204° C. (400° F.) heat and the 4° C. (40° F.) heat are both removed from the system at 38° C. (100° F.), the total COP for heating, or $COP_H$, can be as high as about 1.63+1.0, or about 2.63. Based on the above, the fraction of the heat of adsorption which is regenerated is (0.802–0.202)/0.802 or about 0.75, i.e. about 75% of of the heat of adsorption is regenerated.

Figure 5:
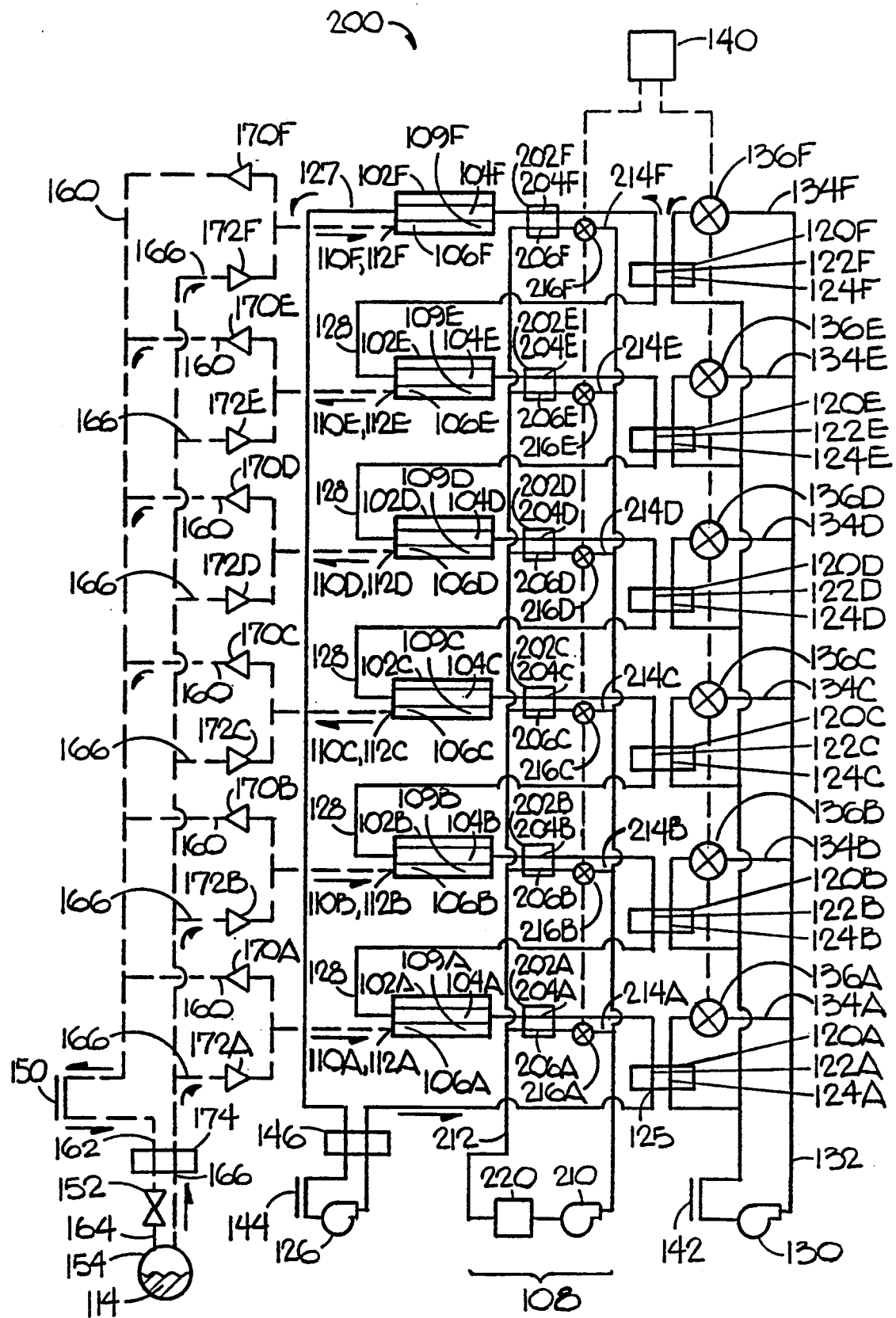
FIG. 5 is a diagram of a second embodiment of this invention having a separate heating loop.

FIG. 5 is a second embodiment of this invention generally designated by numeral 200 in which the primary heating means 108 comprises second indirect heat exchangers 202A–F having first channels 204A–F for the first heat transfer fluid and second channels 206A–F for another heat transfer fluid, sometimes referred to herein as the third heat transfer fluid. First channels 204A–F are also seen to be included in train 128. Heating means 108 also comprises pump 210, sometimes referred to herein as the third pump means, for pumping the third heat transfer fluid through heating loop 212 which contains six parallel branches 214A, 214B, 214C, 214D, 214E and 214F containing control valves 216A, 216B, 216C, 216D, 216E and 216F, respectively, and second channels 206A–F, respectively, of indirect heat exchangers 202A–F, respectively. Control valves 216A–F are sometimes referred to herein as the second control valves. Before returning to pump 210, the third heat transfer fluid is heated by healer 220 to about 204° C. (400° F.) and then continuously circulated around heating loop 212 so that the active second channel 206 always receives the third heat transfer fluid at a temperature of about 204° C. (400° F.).

Control valves 21GA–F are also controlled by controller 140 so that only one of the valves 216A–F is open at a time for a predetermined period of time and the remaining valves are closed, thereby defining a heating cycle. In FIG. 5, which depicts phase 1 of six phases, valve 216C is open thereby permitting heat to be transferred from the third heat transfer fluid in second channel 206C to the first heat transfer fluid in first channel 204C so that it too is heated to a temperature of about 204° C. (400° F.) and which thereby heats the sorbent in chamber 106C also to about 204° C. (400° F.).

In phase 1 the remaining valves 216A,B,D–F are closed thereby preventing heating of the first heat transfer fluid in first channels 204A,B,D–F by the circulating third heat transfer fluid in heating loop 212. The phases and temperatures of embodiment 200 are the same as those described above for embodiment 100 shown in FIG. 1.

Figure 6:
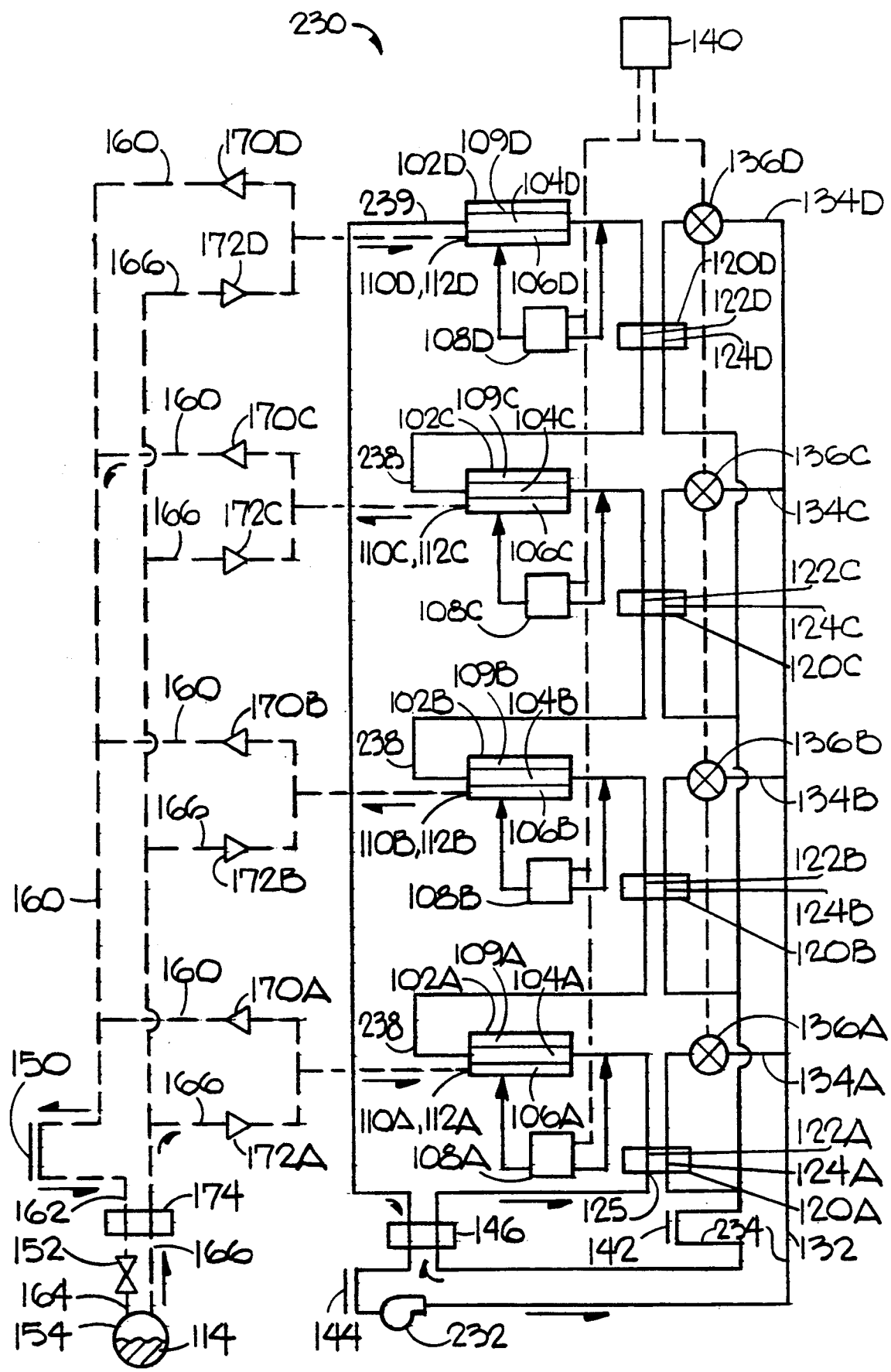
FIG. 6 is a diagram of a third embodiment of this invention having but one pump for a train of four compressors and a coolant loop.

FIG. 6 is a third embodiment of this invention, generally designated by numeral 230, having four compressors 102A, 102B, 102C and 102D and a single pump 232 which conveys a first heat transfer fluid through both the cooling loop 234 and the train 238 of heat conductive passageways 104A, 104B, 104C and 104D. Train 238 has train inlet 125 and train outlet 239 which is also the outlet of heat conductive passageway 104D. The primary heating means 108A, 108B, 108C and 108D has been generally indicated as in FIG. 1. Means 108 can be similar to that described for embodiments 100 and 200 or any other suitable method of adding heat during a heating cycle to the compressors. This embodiment has four phases because there are four compressors. It should be understood, however, that systems with six compressors are preferred to systems with four because more heat is regenerated. FIG. 6 depicts the first phase in which heating device 108B is active and control valve 136D is open while heating devices 108A, 108C and 108D are inactive and valves 136A, 136B and 136C are closed. In this embodiment expected temperature in the phases are as follows:

| Compressor | (°C.) | (°F.) |
| --- | --- | --- |
| 102A | 66–166 | 150–330 |
| 102B | 204–177 | 400–350 |
| 102C | 177–71 | 350–160 |
| 102D | 38–66 | 100–150 |

Figure 9:
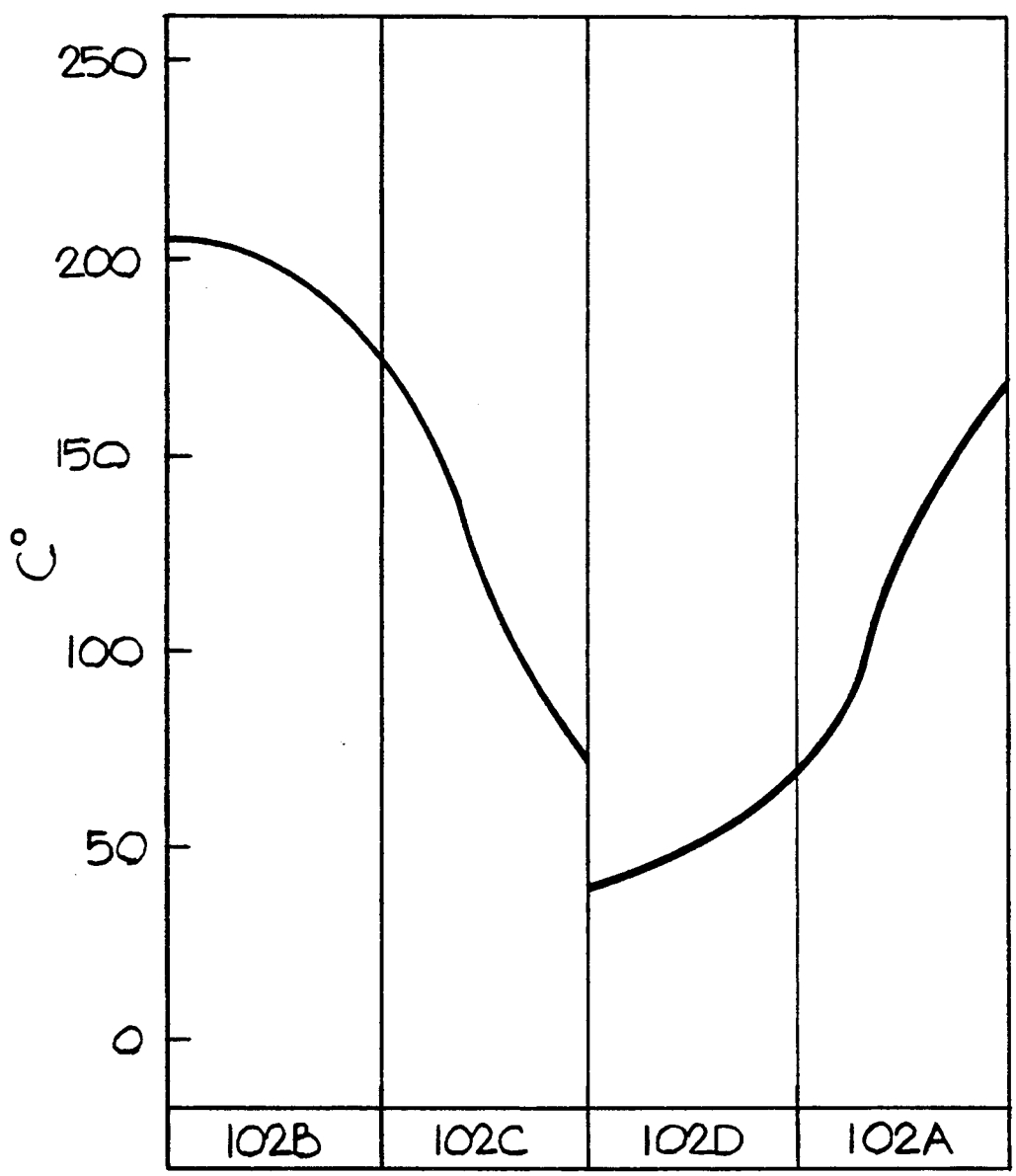
FIG. 9 is a calculated temperature profile of the four compressors of the embodiment of FIG. 6.

The above calculated temperature profiles of the first heat transfer fluid as it flows through train 128 of compressors is shown in FIG. 9 which is a computerized simulation of the system and process. The above profile pertains to a first phase, i.e. phase 1, in the operation of the system of embodiment 100. In general the total number of phases will be equal to the number of compressors. For the system of FIG. 1 the number of phases are six which, when completed, defines a cycle. When a phase is completed the next phase begins and the temperature profiles in the compressors shift as follows:

Phase 2, valve 136A open and heating device 108C heating:

| Compresssor | (°C.) | (°F.) |
| --- | --- | --- |
| 102B | 66–166 | 150–330 |
| 102C | 204–177 | 400–350 |
| 102D | 177–71 | 350–160 |
| 102A | 38–66 | 100–150 |

Phase 3, valve 136B open and heating device 108D heating:

| Compresssor | (°C.) | (°F.) |
| --- | --- | --- |
| 102C | 66–166 | 150–330 |
| 102D | 204–177 | 400–350 |
| 102A | 177–71 | 350–160 |
| 102B | 38–66 | 100–150 |

Phase 4, valve 136C open and heating device 108A heating:

| Compressor | (°C.) | (°F.) |
| --- | --- | --- |
| 102D | 66–166 | 150–330 |
| 102A | 204–177 | 400–350 |
| 102B | 177–71 | 350–160 |
| 102C | 38–66 | 100–150 |

When phase 4 is completed the cycle is completed and a new cycle begins with phase 1; and, the control valve phases, the heating device activation phases, and the phase temperature profiles repeat as set forth above.

Figure 7:
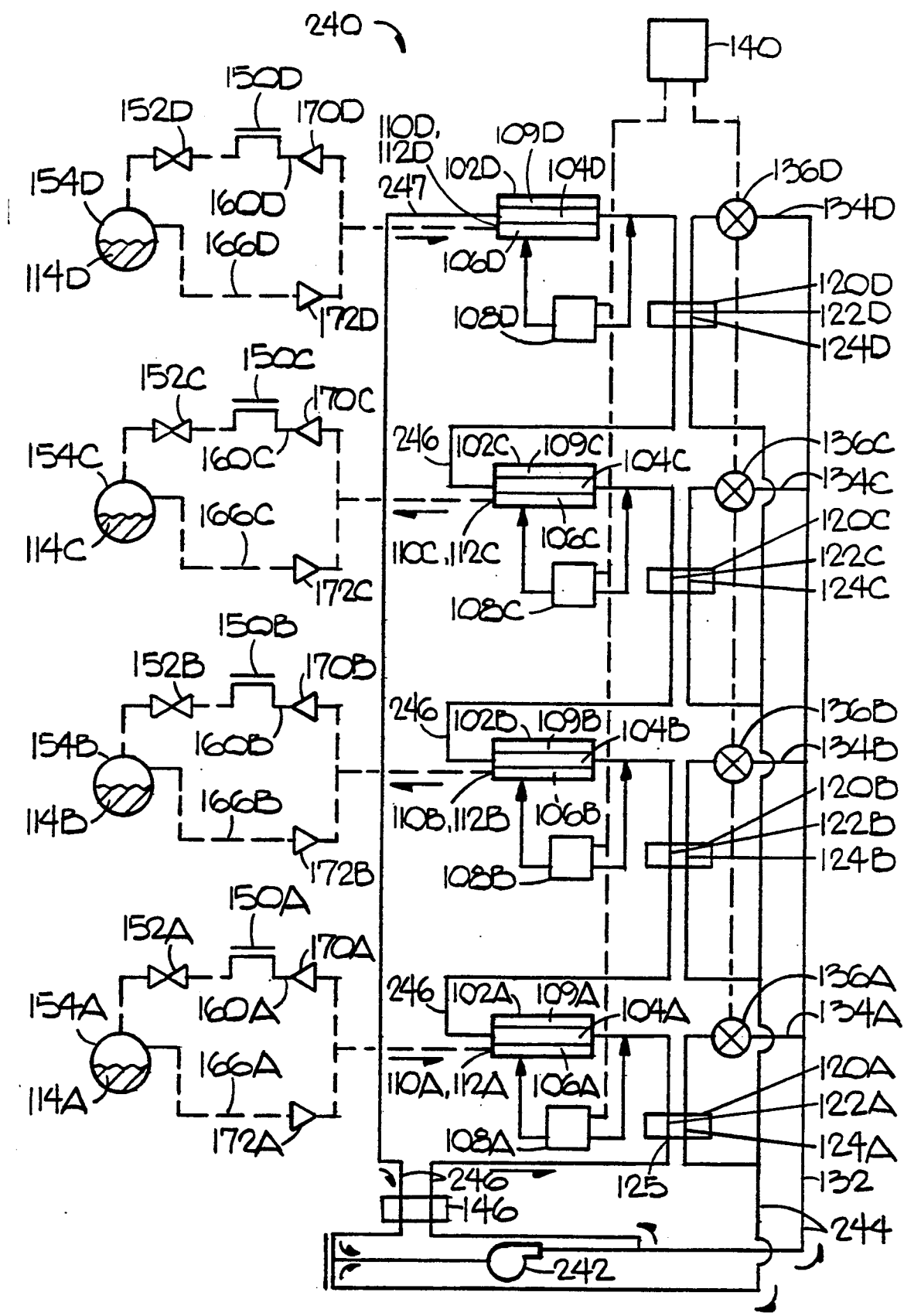
FIG. 7 is a diagram of a fourth embodiment of this invention having but one pump for parallel flow to a train of compressors and a coolant loop.

FIG. 7 is a fourth embodiment of this invention generally designated by numeral 240 having four compressors 102A, 102B, 102C and 102D and a single pump 242 which conveys a first portion of first heat transfer fluid through the cooling loop 244 and a second portion of the first heat transfer fluid through the train 246 of heat conductive passageways 104. Train 246 has train inlet 125 and train outlet 247 which is also the outlet of heat conductive passageway 104D. Although this embodiment is also depicted with four compressors it should be understood that systems with six compressors are preferred to systems with four because more heat is regenerated. The primary heating means, i.e. elements 108A, 108B, 108C and 108D, is generally indicated as in FIG. 1. Means 108 can be similar to that described for embodiments 100 and 200, or any other suitable method of adding heat during a heating cycle to the compressors. Since this embodiment has four phases there are four compressors. FIG. 7 depicts the first phase of four phases in which heating device 108B is active and control valve 136D is open while heating devices 108A, 108C and 108D are inactive and valves 136A, 136B and 136C are closed. In this embodiment expected temperatures in the four phases are the same as those set forth above for embodiment 230. When phase 4 is completed the cycle is completed and a new cycle begins with phase 1; and, the control valve phases, the heating device activation phases, and the phase temperature profiles repeat as set forth above with regard to embodiment 230.

In embodiment 240 the working fluid or refrigerant side has a separate working fluid loop for each compressor rather than one evaporator 114 as in the previously discussed embodiments. For example, the working fluid is desorbed from compressor 102A at a high pressure is permitted by check valve 170A to flow into conduit 160A to radiator or condenser 150A whereupon heat is discharged to the environment. The working fluid is then expanded through J-T valve 150A and then introduced into evaporator 154A whereupon liquid is collected. At the point in the heating cycle when the pressure in compressor 102A is lowered sufficiently, the working fluid is evaporated in evaporator 114A and the vapor is permitted by check valve 172A to enter into compressor 102A through line 166A. As depicted in FIG. 7, each compressor has its own working fluid condenser, J-T valve and evaporator which function in the same manner as described for compressor 102A. It should be understood, however, that the working fluid or refrigerant side can be as in shown in FIGS. 1 and 6 rather than as shown in FIG. 7 depending on the particular intended use of the system.

Figure 8:
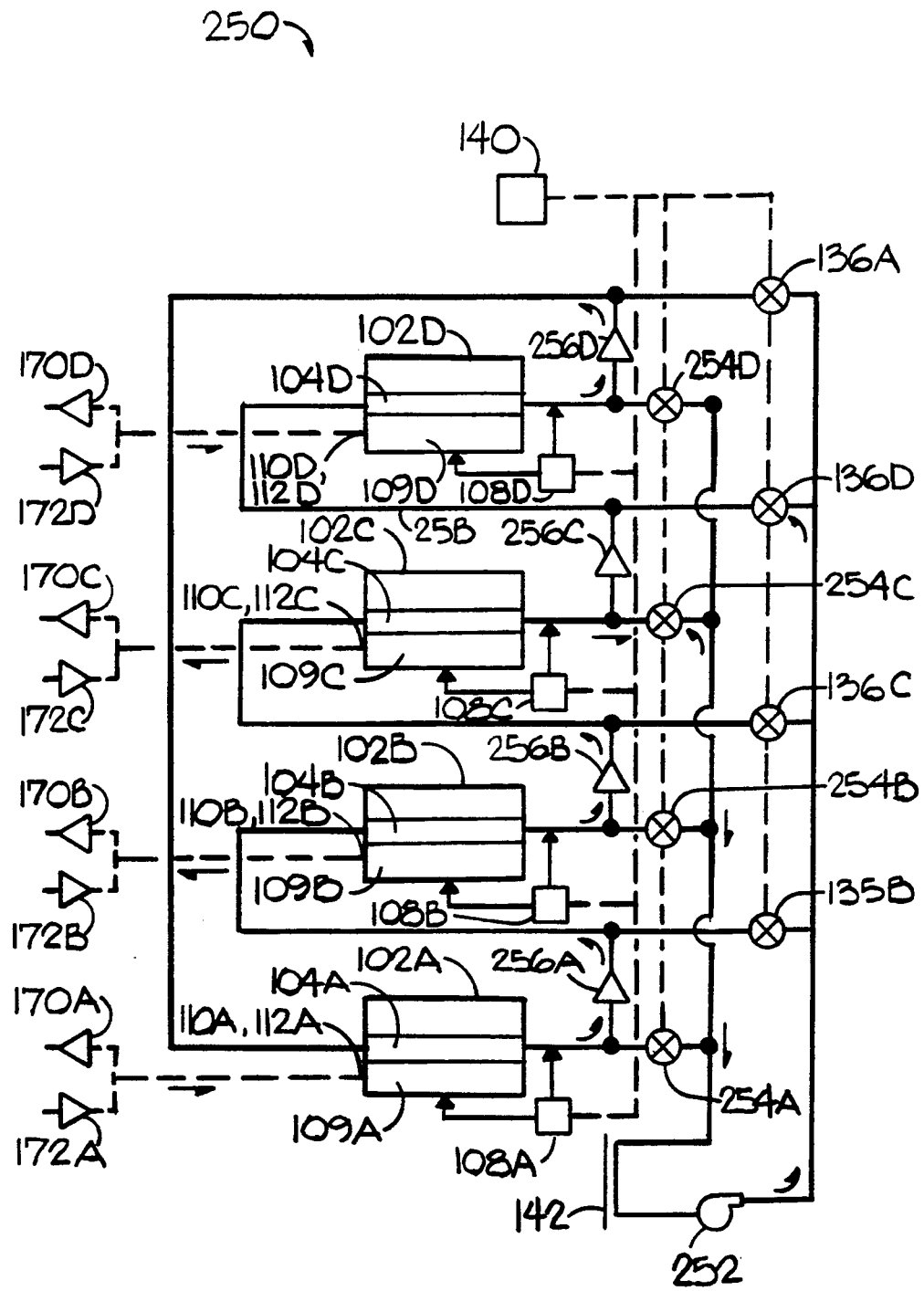
FIG. 8 is a diagram of a fifth embodiment of this invention having a flow control system for both heating and cooling a train of compressors.

FIG. 8 is a fifth embodiment of this invention generally designated by numeral 250 having four compressors 102A, 102B, 102C and 102D and a single pump 252 which conveys a first heat transfer fluid through both the cooling loop and the train of heat conductive passageways 104A, 104B, 104C and 104D. In this embodiment it is to be noted that indirect heat exchangers 120, as employed in the embodiment of FIG. 7, are not required. The primary heating means 108A, 108B, 108C and 108D has been generally indicated as in FIG. 1. Means 108 can be similar to that described for embodiments 100 and 200 or any other suitable method of adding heat during a heating cycle to the compressors. This embodiment has four phases because there are four compressors. It should be understood, however, that systems with six compressors are preferred to systems with four because more heat is regenerated. FIG. 8 depicts the first phase in which heating device 108B is active and control valve 136D is open while heating devices 108A, 108C and 108D are inactive and valves 136A, 136B and 136C are closed. In this embodiment there is a second set of control valves 254A, 254B, 254C and 254D and a corresponding set of check valves 256A, 256B, 256C and 256D. Therefore the train of heat conductive passageways 104A-D also includes valves 136A-D, valves 254A-D and valves 256A-D.

In phase 1 heating device 108B is activated and heating the sorbent in chamber 109B. Simultaneously with such heating, the first heat transfer fluid after being cooled in radiator 142, is conveyed by pump 252 to control valve 136D which is open; valves 136A-C being closed. The cooled first heat transfer fluid then enters heat conductive passageway 104D. Since valve 254D is closed, the line pressure forces check valve 256D open so that the heat transfer fluid then enters heat conductive passageway 104A. Since valve 254A is closed, the line pressure forces check valve 256A open so that the heat transfer fluid then enters heat conductive passageway 104B. Since valve 254B is closed, the line pressure forces check valve 256B open so that the heat transfer fluid then enters heat conductive passageway 104C. Since valve 254C is open, the higher line pressure in conduit 258 prevents check valve 256C from opening so that the heat transfer fluid then flows through valve 254C and back to radiator 142. Valves 136A–D and 254A–D and primary heating means 108A–D are all controlled by controller 140 so that a predetermined valve from set 136 and 254 will remain open a predetermined period of time which corresponds to the heating cycle of a predetermined activated heating device 108. In this embodiment the first heat conductive passageway in the train of heat conductive passageways varies depending upon which one of the four phases of the cycle is active. In phase 1, working fluid is being desorbed in chambers 109B and 109C, and adsorbed in chambers 109D and 109A.

In embodiment 250 the expected temperatures in the four phases are the same as those set forth above for embodiment 230. When phase 4 is completed the cycle is completed and a new cycle begins with phase 1; and, the control valve phases, the heating device activation phases, and the phase temperature profiles repeat as set forth above with regard to embodiment 230. These expected temperatures are without "topping" or "bottoming" after each phase. Topping and/or bottoming after each phase can improve performance even more. For example, at the end of phase 1, an optional topping or bottoming step may be added to further reduce thermal gradients in the hottest or coolest compressor. To provide "bottoming", i.e. to cool compressor 102D further, valves 136D and 254D would be open for a predetermined period of time, while all other valves are closed. To provide "topping" at the end of Phase 1, heating means 108D would be activated while the series flow of heat transfer fluid through all the compressors is interrupted, or while "bottoming" is taking place.

In embodiment 250 the working fluid or refrigerant side has not been shown since it can be as in shown in FIGS. 1 and 6 or as shown in FIG. 8 depending on the particular intended use of the system.

In all of the above described examples the temperature profiles in the several compressors were based on the use of R134a as the working fluid and the cycle shown in FIG. 3. Other working fluids can be used.

Examples of useful heat transfer fluids are the Dowtherm ™ brand fluids and water. Other heat transfer fluids can also be used if desired.

In general, for all embodiments, it should be noted that by keeping the pressure ratio $P_H/P_L$ close to unity, it is possible to regenerate almost all of both the sensible heat and the heat of adsorption. That is systems which have $P_H/P_L$ very close to unity will take very little power to operate.

It should be noted that by keeping the pressure ratio or $P_H/P_L$ low and the temperature overlap of the sorbing and desorbing operations high that it is possible to regenerate at least some of the heat of adsorption. Therefore in one embodiment of this invention the $P_H/P_L$ is no greater than about 3 and the temperature overlap is at least about 77 Celsius (170 Fahrenheit) degrees.

Detailed computerized thermal models have shown that the final $COP_S$ for the embodiments of this invention can be at least about 90% of the ideal $COP_S$. The improved results of this invention are due primarily to the low thermal gradients in the compressors achieved through the improved regenerative heat systems of this invention, whereas the large thermal gradients existing in the prior art systems cause inherent large system energy losses. The elimination of such thermal gradients allows a much higher regeneration efficiency for the system.

In all systems, however, there are minor losses due to parasitic heat loss from insulated surfaces, small regenerator inefficiencies, circulation pump power requirements, end-to-end sorption canister conduction heat leaks, and hot exhausting refrigerant gas thermal capacitance heat loss. These losses can be minimized by conventional heat design techniques of external insulation, low coolant line pressure drop passages, low end-to-end sorption canister thermal conductance design, and refrigerant vapor thermal regenerators.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. For example, conventional flow systems components such as accumulators and additional pumps and the like can be included in the systems if desired. The claims, therefore, are to be accorded a range of equivalents commensurate in scope with the advances made over the art.

INDUSTRIAL APPLICABILITY

The regenerative adsorbent heat pump processes and systems of this invention are useful for air conditioning rooms and buildings and can also be used for heating in the winter and producing hot water throughout the year, and in general, for pumping heat from a low temperature to a higher temperature.

I claim:

1. A regenerative sorbent heat pump process for cooling an interior space and for simultaneously regenerating at least a portion of the heat of adsorption comprising:
    (a) confining a sorbent in a plurality of compressor zones, the number of compressor zones being at least four;
    (b) introducing a working fluid vapor from an evaporization zone into at least one of the number of compressor zones and sorbing the working fluid vapor on the sorbent therein over a predetermined first temperature range and a predetermined first pressure or $P_L$;
    (c) desorbing working fluid vapor from the sorbent in at least one of the remaining number of compressor zones and removing working fluid vapor therefrom over a predetermined second temperature range which is higher than the predetermined first temperature range and at a predetermined second pressure or $P_H$ which is larger than the predetermined first pressure, a part of the predetermined first temperature range overlapping a part of the predetermined second temperature range;
    (d) condensing working fluid vapor removed from said at least one of the remaining number of the compressor zones at $P_H$ and transferring heat from the working fluid to the environment thereby forming a working fluid liquid;
    (e) evaporating the working fluid liquid and forming the working fluid vapor in the evaporation zone at $P_L$ by transferring heat from an interior space to the evaporation zone thereby cooling the interior space;
    (f) circulating a heat transfer fluid in a closed loop which comprises a heat removal zone and series flow through the compressor zones and preventing the heat transfer fluid from directly contacting the sorbent;
    (g) removing heat from the heat transfer fluid in the heat removal zone and transferring it to the environment;
    (h) adding heat from a heat source to a predetermined one of the compressor zones over a predetermined period of time;
    (i) cooling the coolest compressor further to a predetermined bottoming temperature;
    (j) after step (i), repeating step (h) sequentially in each of the compressor zones;
    (k) indirectly transferring heat from the sorbent in the compressor zones which are sorbing working fluid vapor to the heat transfer fluid and from the heat transfer fluid to the sorbent in the compressor zones which are desorbing working fluid vapor thereby regenerating heat; and, (l) maintaining the $P_H/P_L$ ratio sufficiently low so that at least a portion of the heat of absorption is regenerated.

2. The process of claim 1, further comprising maintaining the $P_H/P_L$ ratio between about 1.1 and about 10.

3. The process of claim 1, further comprising maintaining the $P_H/P_L$ ratio between about 1.1 and about 5.

4. The process of claim 1, further comprising maintaining the $P_H/P_L$ ratio between about 1.1 and about 3.

5. The process of claim 1, further comprising maintaining the $P_H/P_L$ ratio sufficiently Low that about 25% of the heat of adsorption is regenerated.

6. The process of claim 1, further comprising maintaining the $P_H/P_L$ ratio sufficiently low that about 50% of the heat of adsorption is regenerated.

7. The process of claim 1, further comprising maintaining the $P_H/P_L$ ratio sufficiently low that about 70% of the heat of adsorption is regenerated.

8. The process of claim 1, wherein the predetermined first temperature range is from at least about $-18°$ C. to no more than about 204° C., wherein the predetermined second temperature range is from at Least about 38° C. to no more than about 427° C., and, wherein the predetermined first and predetermined second temperature ranges overlap at least about 28 Celsius degrees.

9. The process of claim 1, wherein the predetermined first temperature range is from at least about $-18°$ C. to no more than about 204° C., wherein the predetermined second temperature range is from at least about 32° C. to no more than about 316° C., and, wherein the predetermined first and predetermined second temperature ranges overlap at least about 56 Celsius degrees.

10. The process of claim 1, wherein the predetermined first temperature range is From at least about $-18°$ C. to no more than about 204° C., wherein the predetermined second temperature range is from at Least about 38° C. to no more than about 260° C., and, wherein the predetermined first and predetermined second temperature ranges overlap at least about 56 Celsius degrees.

11. The process of claim 1, wherein the predetermined first temperature range is from at least about 10° C. to no more than about 177° C., wherein the predetermined second temperature range is from at least about 38° C. to no more than about 232° C., and, wherein the predetermined first and predetermined second temperature ranges overlap at least about 83 Celsius degrees.

12. The process of claim 1, wherein the working fluid is selected from the group consisting of fluorine substituted ethanes, and, fluorine and chlorine substituted ethanes.

13. The process of claim 1, wherein the working fluid is selected from the group consisting of 2-chloro-1,1,1,2-tetrafluoroethane, 1,1-dichloro-2,2,2-trifluoroethane, 1,1,1,2-tetrafluoroethane, ammonia, and water.

14. The process of claim 1, wherein the sorbent selected from the group consisting of activated carbons, zoolites, silica gels and alumina.

15. A regenerative sorbent heat pump process for cooling an interior space and for simultaneously regenerating at least a portion of the heat of adsorption comprising:

(a) confining a sorbent in a plurality of compressor zones, the number of compressor zones being at least four;

(b) introducing a working fluid vapor from an evaporation zone into at least one of the number of compressor zones and sorbing the working fluid vapor on the sorbent therein over a predetermined first temperature range and a predetermined first pressure or $P_L$;

(c) desorbing working fluid vapor from the sorbent in at least one of the remaining number of compressor zones and removing working fluid vapor therefrom over a predetermined second temperature range which is higher than the predetermined first temperature range and at a predetermined second pressure or $P_H$ which is higher than the predetermined first pressure, a part of the predetermined first temperature range overlapping a part of the predetermined second temperature range;

(d) condensing working fluid vapor removed from said at least one of the remaining number of the compressor zones at $P_H$ and transferring heat from the working fluid to the environment thereby forming a working fluid liquid;

(e) evaporating the working fluid liquid and forming the working fluid vapor in the evaporation zone at $P_L$ by transferring heat from an interior space to the evaporation zone thereby cooling the interior space;

(f) circulating a heat transfer fluid in a closed loop which comprises a heat removal zone and series flow through the compressor zones and preventing the heat transfer fluid from directly contacting the sorbent;

(g) removing heat from the heat transfer fluid in the heat removal zone before it flows to a predetermined one of the compressor zones and transferring the removed heat to the environment;

(h) cooling the coolest compressor further to a predetermined bottoming temperature;

(i) after step (h), repeating step (g) sequentially for each of the compressor zones;

(j) adding heat from a heat source to a predetermined one of the compressor zones over a predetermined period of time;

(k) repeating step (j) sequentially in each of the compressor zones;

(l) indirectly transferring heat from the sorbent in the compressor zones which are sorbing working fluid vapor to the heat transfer fluid and from the heat transfer fluid to the sorbent in the compressor zones which are desorbing working fluid vapor thereby regenerating heat; and, (m) maintaining the $P_H/P_L$ ratio sufficiently low so that at least a portion of the heat of adsorption is regenerated.

16. A regenerative sorbent heat pump process for cooling an interior space and for simultaneously regenerating at least a portion of the heat of adsorption comprising:

(a) confining a sorbent in a plurality of compressor zones, the number of compressor zones being at least four;

(b) introducing a working fluid vapor from an evaporation zone into at least one of the number of compressor zones and sorbing the working fluid vapor on the sorbent therein over a predetermined first temperature range and a predetermined first pressure or $P_L$;

(c) desorbing working fluid vapor from the sorbent in at least one of the remaining number of compressor zones and removing working fluid vapor therefrom over a predetermined second temperature range which is higher than the predetermined first temperature range and at a predetermined second pressure or $P_H$ which is higher than the predetermined first pressure, a part of the predetermined first temperature range overlapping a part of the predetermined second temperature range;

(d) condensing working fluid vapor removed from said at least one of the remaining number of the compressor zones at $P_H$ and transferring heat from the working fluid to the environment thereby forming a working fluid liquid;

(e) evaporating the working fluid liquid and forming the working fluid vapor in the evaporation zone at $P_L$ by transferring heat from an interior space to the evaporation zone thereby cooling the interior space;

(f) circulating a first heat transfer fluid in a closed loop which comprises a heat removal zone and series flow through the compressor zones and preventing the first heat transfer fluid from directly contacting the sorbent;

(g) indirectly transferring heat from the first heat transfer fluid in the heat removal zone before it flows to a predetermined one of the compressor zones to a second heat transfer fluid;

(h) removing heat from a second heat transfer fluid and transferring it to the environment;

(i) adding heat from a heat source to a predetermined one of the compressor zones over a predetermined period of time;

(j) cooling the coolest compressor further to a predetermined bottoming temperature;

(k) after step (j), repeating step (i) sequentially in each of the compressor zones;

(l) indirectly transferring heat from the sorbent in the compressor zones which are sorbing working fluid vapor to the first heat transfer fluid and from the first heat transfer fluid to the sorbent in the compressor zones which are desorbing working fluid vapor thereby regenerating heat; and, (m) maintaining the $P_H/P_L$ ratio sufficiently low so that at least a portion of the heat of adsorption is regenerated.

17. The process of claim 16, further comprising repeating step (g) sequentially for each of the compressor zones.

18. The process of claim 16, wherein adding heat from a heat source to a predetermined one of the compressor zones over a predetermined period of time is performed by adding heat to a third heat transfer fluid, and, indirectly transferring heat from the third heat transfer fluid to the first heat transfer fluid before it enters the predetermined one of the compressor zones.

19. The process of claim 18, further comprising repeating step (g) sequentially for each of the compressor zones.

20. A regenerative sorbent heat pump system comprising:

a working fluid being operable for being sorbed by a sorbent;

a plurality of compressors, the number of compressors being at least four, each of the compressors having
a sorbent contained within the compressor, and
a heat conductive passageway having an inlet and an outlet, the heat conductive passageway for flowing a heat transfer fluid through the compressor and for indirectly transferring heat between the sorbent and the heat transfer fluid without the heat transfer fluid being in contact with the sorbent;

means for removing high temperature, high pressure working fluid vapor from each of the compressors;

condensing means for transferring heat from the working fluid to a low temperature heat sink, and, for condensing working fluid vapor to form a low temperature, high pressure working fluid liquid;

evaporating means for converting low temperature, high pressure working fluid liquid to low temperature, low pressure working fluid vapor, and, for transferring heat from a low temperature source external of the system to the working fluid;

liquid conveying means for conveying low temperature, high pressure working fluid liquid from the condensing means to the evaporating means;

vapor conveying means for conveying low temperature, low pressure working fluid vapor into each of the compressors;

a first heat transfer fluid and a second heat transfer fluid;

a plurality of indirect heat exchange means, the number of indirect heat exchange means being equal to the number of the compressors, each of the indirect heat exchange means having a first channel for flowing the first heat transfer fluid, and a second channel for flowing the second heat transfer fluid, the channels being isolated from fluid communication with each other, the first channel being in heat conductive communication with the second channel, each of the channels having an inlet and an outlet;

a train formed by connecting in alternating order, the first channels of the indirect heat exchange means to the heat conductive passageways, the train having an inlet which is also the inlet of the first channel of the first-in-the-series of indirect heat exchange means of the train, and, the train having an outlet which is also the outlet of the heat conductive passageway of the last-in-the-series of compressors of the train;

first pumping means for pumping the first heat transfer fluid around the train, the outlet of the first pumping means being connected to the train inlet and the train outlet being connected to the first pumping means inlet;

second pumping means for pumping the second heat transfer fluid;

connecting means for connecting the outlet of the second pumping means to the inlet of the second channel of each of the internal heat exchange means, and for connecting the outlet of each of the second channels thereof to the second pumping means inlet;

flow control mean for directing the second heat transfer fluid from the second pumping means to the second channel of a predetermined one of the indirect heat exchange means in a predetermined order thereby defining a flow cycle, and, for enabling heat transfer between the first heat transfer fluid in the first channel thereof and the second heat transfer fluid in the second channel thereof;

primary heating means for heating each of the compressors;

heat control means for controlling the heating period of the primary heating means in each of the compressors thereby defining a heating cycle; and, heat discharge means for transferring heat from the second heat transfer fluid in the connecting means from the second channels to the second pump means, to a low temperature heat sink thereby providing a regenerative sorbent heat pump system.

21. The system of claim 20, wherein the number of compressors is four.

22. The system of claim 20, wherein the number of compressors is six.

23. The system of claim 20, further comprising heat exchanger means for the indirect transfer of heat between the low temperature, high pressure working fluid liquid in the liquid conveying means and the low temperature, low pressure working fluid vapor in the vapor conveying means.

24. The system of claim 20, further comprising means for coordinating the flow cycle and the heating cycle.

25. The system of claim 20, further comprising auxiliary heat exchanger means for indirectly exchanging heat between the first heat transfer fluid flowing to the train and the first heat transfer fluid flowing from the train.

26. The system of claim 20, further comprising means for transferring heat from the first heat transfer fluid flowing from the train to a low temperature heat sink.

27. The system of claim 25, further comprising means for transferring heat from the first heat transfer fluid flowing from the auxiliary heat exchanger means to a low temperature heat sink.

28. The system of claim 20, wherein the working fluid is sorbed over a predetermined first temperature range from at least about $-18°$ C. to no more than about $204°$ C. wherein the working fluid is desorbed over a predetermined second temperature range from at least about $38°$ C. to no more than about $427°$ C., and, wherein the predetermined. First and predetermined second temperature ranges overlap at least about 28 Celsius degrees.

29. The system of claim 20, wherein the working fluid selected From the group consisting of fluorine substituted ethanes, fluorine and chlorine substituted ethanes, and, wherein the sorbent is selected From the group consisting activated carbons.

30. The system of claim 20, wherein the primary heating means comprises a heating device between each of the compressors in the train and between the first pumping means outlet and the inlet to the heat conductive passageway of each compressor, the heating devices for heating the first heat transfer fluid before it is introduced into the compressor for which it is intended, the thusly heated first heat transfer fluid thereby heating said compressor.

31. The system of claim 20, further comprising a plurality of second indirect heat exchange means, the number of second indirect heat exchange means being equal to the number of the compressors, each of the second indirect heat exchange means having a first channel for flowing a heat transfer fluid, and a second channel for flowing a heat transfer fluid, the channels thereof being isolated from communication with each other, the first channel thereof being in heat conductive communication with the second channel thereof, each of the channels thereof having an inlet and an outlet;

wherein the train includes the first channels of the second indirect heat exchange means connected, relative to the heat conductive passageways, in alternating order before each of the heat conductive passageways; and, further comprising third pumping means for pumping a third heat transfer fluid;

second connecting means for connecting the outlet of the third pumping means to the inlet of the second channel of each of the second internal heat exchange means, and for connecting the outlet of each of the second channels thereof to the third pumping means inlet; and, flow control means for directing the third heat transfer fluid from the third pumping means to the second channel of a predetermined one of the second indirect heat exchange means in a predetermined order thereby defining a second flow cycle, and, for enabling heat transfer between the first heat transfer fluid in the first channel thereof and the third heat transfer fluid in the second channel thereof; and, wherein the primary heating means includes a heating device in the second connecting means for heating the third heat transfer fluid before it is introduced into the second channel of a predetermined one of the second indirect heat exchange means; and, wherein the heat control means includes means for controlling the temperature of the third heat transfer fluid heated by the heating devices.

32. A regenerative sorbent heat pump system comprising:

a working fluid being operable for being sorbed by a sorbent;

a plurality of compressors, the number of compressors being at least four, each of the compressors having a sorbent contained within the compressor, and a heat conductive passageway having an inlet and an outlet, the heat conductive passageway for flowing transfer fluid through the compressor and for indirectly transferring heat between the sorbent and the heat transfer fluid without the heat transfer fluid being in contact with the sorbent;

means for removing high temperature, high pressure working fluid vapor from each of the compressors;

condensing means for transferring heat from the working fluid to a low temperature heat sink, and, for condensing working fluid vapor to form a low temperature, high pressure working fluid liquid;

evaporating means for converting low temperature, high pressure working fluid liquid to low temperature, low pressure working fluid vapor, and, for transferring heat from a low temperature source external of the system to the working fluid;

liquid conveying means for conveying low temperature, high pressure working fluid liquid from the condensing means to the evaporating means;

vapor conveying means for conveying low temperature, low pressure working fluid vapor into each of the compressors;

a heat transfer fluid;

a plurality of indirect heat exchange means, the number of indirect heat exchange means being equal to the number of the compressors, each of the indirect heat exchange means having a first channel for flowing the heat transfer fluid, and a second channel for flowing the heat transfer fluid, the channels being isolated from immediate fluid communication with each other, the first channel being in heat conductive communication with the second channel, each of the channels having an inlet and an outlet;

a train formed by connecting in alternating order, the first channels of the indirect heat exchange means to the heat conductive passageways, the train having an inlet which is also the inlet of the first channel of the first-in-the-series of the indirect heat exchange means of the train, and, the train having an outlet which is also the outlet of the heat conductive passageway of the last-in-the-series of compressors of the train;

pumping means for pumping the heat transfer fluid;

first connecting means for connecting the outlet of the pumping means to the inlet of each of the second channels;

second connecting means for connecting the outlet of each of the second channels to the train inlet;

third connecting means for connecting the train outlet to the pumping means inlet;

flow control means for directing the heat transfer fluid from the pumping means to the second channel of a predetermined one of the indirect heat exchange means in a predetermined order thereby defining a flow cycle, and, for enabling heat transfer between the heat transfer fluid in the first channel thereof and the heat transfer fluid in the second channel thereof;

primary heating means for heating each of the compressors;

heat control means for controlling the heating period of the primary heating means in each of the compressors thereby defining a heating cycle; and, heat discharge means for transferring heat from the heat transfer fluid in the second connecting means to a low temperature heat sink thereby providing a regenerative sorbent heat pump system.

33. The system of claim 32, further comprising auxiliary heat exchanger means for indirectly exchanging heat between the heat transfer fluid in the second connecting means and the heat transfer fluid in the third connecting means.

34. The system of claim 32, further comprising means for transferring heat from the heat transfer fluid in the third connecting means to a low temperature heat sink.

35. The system of claim 33, further comprising means for transferring heat from the heat transfer fluid flowing from the auxiliary heat exchanger means in the third connecting means to a low temperature heat sink.

36. The system of claim 32, wherein the primary heating means comprises a heating device between each of the compressors in the train and between the pumping means outlet and the inlet to the heat conductive passageway of each compressor, the heating devices for heating the heat transfer fluid before it is introduced into the compressor of which it is intended, the thusly heated heat transfer fluid thereby heating said compressor.

37. A regenerative sorbent heat pump system comprising:

a working fluid being operable for being sorbed by a sorbent;

a plurality of compressors, the number of compressors being at least four, each of the compressors having
a sorbent contained within the compressor, and
a heat conductive passageway having an inlet and an outlet, the heat conductive passageway for flowing a heat transfer fluid through the compressor and for indirectly transferring heat between the sorbent and the heat transfer fluid without the heat transfer fluid being in contact with the sorbent;

means for removing high temperature, high pressure working fluid vapor from each of the compressors;

condensing means for transferring heat from the working fluid to a low temperature heat sink, and, for condensing working fluid vapor to form a low temperature, high pressure working fluid liquid;

evaporating means for converting low temperature, high pressure working fluid liquid to low temperature, low pressure working fluid vapor, and, for transferring heat from a low temperature source external of the system to the working fluid;

liquid conveying means for conveying low temperature, high pressure working fluid liquid from the condensing means to the evaporating means;

vapor conveying means for conveying low temperature low pressure working fluid vapor into each of the compressors;

a heat transfer fluid;

a plurality of indirect heat exchange means, the number of indirect heat exchange means being equal to the number of the compressors, each of the indirect heat exchange means having a first channel for flowing a primary portion of the heat transfer fluid, and a second channel for flowing a secondary portion of the heat transfer fluid, the channels being isolated from fluid communication with each other, the first channel being in heat conductive communication with the second channel, each of the channels having an inlet and an outlet;

a train formed by connecting in alternating order, the first channels of the indirect heat exchange means to the heat conductive passageways, the train having an inlet which is also the inlet of the first channel of the first-in-the-series of indirect heat exchange means of the train, and, the train having an outlet which is also the outlet of the heat conductive passageway of the last-in-the-series of compressors of the train;

first pumping means for pumping the primary portion of a heat transfer fluid around the first train, the outlet of the first pumping means being connected to the train inlet and the train outlet being connected to the first pumping means inlet;

second pumping means for pumping the secondary portion of the heat transfer fluid;

connecting means for connecting the outlet of the second pumping means to the inlet of the second channel of each of the internal heat exchange means, and for connecting the outlet of each of the second channels thereof to the second pumping means inlet;

flow control means for directing the secondary portion of the heat transfer fluid from the second pumping means to the second channel of a predetermined one of the indirect heat exchange means in a predetermined order thereby defining a flow cycle, and, for enabling heat transfer between the primary portion of the heat transfer fluid in the first channel thereof and the secondary portion of the heat transfer fluid in the second channel thereof;

primary heating means for heating each of the compressors;

heat control means for controlling the heating period of the primary heating means in each of the compressors thereby defining a heating cycle;

means for transferring heat from the primary portion of the heat transfer fluid flowing from the train to a low temperature heat sink; and, heat discharge means for transferring heat rom the secondary portion of the heat transfer fluid in the connecting means from the second channels to the second pump means, to a low temperature heat sink thereby providing a regenerative sorbent heat pump system.

38. The system of claim 37, wherein the primary pumping means is also the secondary pumping means.

39. The system of claim 37, wherein the primary heating means comprises a heating device between each of the compressors in the train and between the first pumping means outlet and the train inlet, the heating devices for heating the first heat transfer fluid before it is introduced into the compressor for which it is intended the thusly heated first heat transfer fluid thereby heating said compressor.

40. The system of claim 37, further comprising auxiliary heat exchanger means for indirectly exchanging heat between the primary portion of the heat transfer fluid flowing to the train and the primary portion of the heat transfer fluid flowing from the train.

41. A regenerative sorbent heat pump system for regeneration of at least a portion of the heat of adsorption comprising:

a working fluid being operable for being sorbed by a sorbent over a predetermined first temperature range thereby producing a heat of adsorption, and for being desorbed from the sorbent over a predetermined second temperature range which is higher than the predetermined first temperature range, a part of the predetermined first temperature range overlapping a part of the predetermined second temperature range thereby enabling regeneration of at least a portion of the heat of adsorption;

a plurality of compressors, the number of compressors being at least four, each of the compressors having a sorbent contained within the compressor, and a heating conductive passageway having an inlet and an outlet, the heat conductive passageway for flowing a heat transfer fluid through the compressor and for indirectly transferring heat between the sorbent and the heat transfer fluid without the heat transfer fluid being in contact with the sorbent;

means for removing high temperature, high pressure working fluid vapor from each of the compressors;

condensing means for transferring heat from the working fluid to a low temperature heat sink, and, for condensing working fluid vapor to form a low temperature, high pressure working fluid liquid;

evaporating means for converting low temperature, high pressure working fluid liquid to low temperature, low pressure working fluid vapor, and, for transferring heat from a low temperature source external of the system to the working fluid;

liquid conveying means for conveying low temperature, high pressure working fluid liquid from the condensing means to the evaporating means;

vapor conveying means for conveying low temperature, low pressure working fluid vapor into each of the compressors;

first connecting means for forming a loop of heat conductive passageways by connecting the outlet of one heat conductive passageway to the inlet of another heat conductive passageway and proceeding with such inlet-to-outlet connections until the outlet of the last heat conductive passageway is connected to the inlet of the first heat conductive passageway thereby forming a loop of heat conductive passageways;

a heat transfer fluid;

pumping means for pumping the a heat transfer fluid;

second connecting means for connecting the outlet of the pumping means to the inlet of each of the heat conductive passageways;

third connecting means for connecting the outlet of each of the heat conductive passageways to the pumping means inlet;

flow control means for directing the heat transfer fluid from the pumping means to the inlet of a predetermined one of the heat conductive passageways, then around the loop passing through each of the heat conductive passageways only once, and then to the pumping means;

phase timing means for redirecting the heat transfer fluid after a predetermined time interval, from the pumping means to another one of the heat conductive passageways thereby beginning a new phase, and for repeating such redirecting after such predetermined time intervals to other of the heat conductive passageways, until the heat transfer fluid is directed from the pumping means to each of the heat conductive passageways thereby completing a flow cycle;

primary heating means for heating each of the compressors;

heat control means for controlling the heating period of the primary heating means in each of the compressors; and, heat discharge means for transferring heat from the heat transfer fluid in the third connecting means to a low temperature heat sink thereby providing a regenerative sorbent heat pump system operable for regeneration of at least a portion of the heat of adsorption.

42. The process of claim 41, wherein the primary heating means comprises a heating device between each of the compressors in the loop for heating the heat transfer fluid in the first connecting means before the heat transfer fluid is introduced into the heat conductive passageway of the compressor for which it is intended thereby heating such compressor.

43. The process of claim 1 further comprising, before performing step (i), heating the hottest compressor further to a predetermined topping temperature.

44. The process of claim 15 further comprising, before performing step (j), heating the hottest compressor further to a predetermined topping temperature.

45. The process of claim 16 further comprising, before performing step (j), heating the hottest compressor further to a predetermined topping temperature.

46. The process of claim 1, wherein the heat transfer fluid is a liquid.

47. The process of claim 1, wherein the heat transfer fluid is selected from the group consisting of mixtures of diphenyl and diphenyl oxide, orthodichlorobenzene, ethylene glycol, methoxypropanol, and water.

48. The process of claim 15, wherein the heat transfer fluid is a liquid.

49. The process of claim 15, wherein the heat transfer fluid is selected from the group consisting of mixtures of diphenyl and diphenyl oxide, orthodichlorobenzene, ethylene glycol, methoxypropanol, and water.

50. The process of claim 16, wherein the first heat transfer fluid is a liquid.

51. The process of claim 16, wherein the first heat transfer fluid is selected from the group consisting of mixtures of diphenyl and diphenyl oxide, orthodichlorobenzene, ethylene glycol, methoxypropanol, and water.

52. The process of claim 16, wherein the second heat transfer fluid is a liquid.

53. The process of claim 16, wherein the second heat transfer fluid is selected from the group consisting of mixtures of diphenyl and diphenyl oxide, orthodichlorobenzene, ethylene glycol, methoxypropanol, and water.

54. The process of claim 16, wherein the first and second heat transfer fluid are liquids.

55. The process of claim 16, wherein the first and second heat transfer fluids are selected from the group consisting of mixtures of diphenyl and diphenyl oxide, ortho-dichlorobenzene, ethylene glycol, methoxypropanol, and water.

56. The system of claim 20, wherein the first and second heat transfer fluid are liquids.

57. The system of claim 20, wherein the first and second heat transfer fluids are selected from the group consisting of mixtures of diphenyl and diphenyl oxide, ortho-dichlorobenzene, ethylene glycol, methoxypropanol, and water.

58. The process of claim 1, further comprising refrigerant vapor thermal regenerating.

59. The system of claim 31, further comprising means for refrigerant vapor thermal regeneration.

* * * * *

UNITED STATES PATENT AND TRADEMARK OFFICE
CERTIFICATE OF CORRECTION

PATENT NO. :   5,347,815
DATED      :   Sep. 20, 1994
INVENTOR(S) :  Jack A. Jones It is certified that error appears in the above-indentified patent and that said Letters Patent is hereby corrected as shown below:

Col. 15, line 26, replace "wants" with "watts".

Col. 19, line 15, replace "Dowtherm TM" with "Dowtherm™".

Column 32

Claim 59, line 1, replace "31" with "41".

Signed and Sealed this

Twenty-fifth Day of April, 1995

BRUCE LEHMAN

*Attest:*

*Attesting Officer*            *Commissioner of Patents and Trademarks*